United States Patent
Takabe

(10) Patent No.: US 8,328,650 B2
(45) Date of Patent: Dec. 11, 2012

(54) CONSTANT VELOCITY UNIVERSAL JOINT

(75) Inventor: Shinichi Takabe, Iwata (JP)

(73) Assignee: NTN Corporation, Osaka (JP)

(*) Notice: Subject to any disclaimer, the term of this patent is extended or adjusted under 35 U.S.C. 154(b) by 211 days.

(21) Appl. No.: 12/676,014

(22) PCT Filed: Aug. 11, 2008

(86) PCT No.: PCT/JP2008/064421
§ 371 (c)(1),
(2), (4) Date: Mar. 2, 2010

(87) PCT Pub. No.: WO2009/034803
PCT Pub. Date: Mar. 19, 2009

(65) Prior Publication Data
US 2010/0197413 A1 Aug. 5, 2010

(30) Foreign Application Priority Data
Sep. 10, 2007 (JP) ................ 2007-234238

(51) Int. Cl.
*F16D 3/84* (2006.01)
(52) U.S. Cl. ........................ 464/175; 464/905
(58) Field of Classification Search .......... 464/111, 464/175, 905; 277/636
See application file for complete search history.

(56) References Cited

U.S. PATENT DOCUMENTS

| | | | | |
|---|---|---|---|---|
| 6,179,717 B1* | 1/2001 | Schwarzler | ................. | 464/175 |
| 6,921,091 B2* | 7/2005 | Neviani | ................. | 464/175 X |
| 2004/0116193 A1* | 6/2004 | Toriumi et al. | ................. | 464/175 |
| 2005/0192107 A1 | 9/2005 | Toriumi et al. | | |
| 2006/0125194 A1* | 6/2006 | Toriumi | | |
| 2007/0026953 A1 | 2/2007 | Ohshita et al. | | |

FOREIGN PATENT DOCUMENTS

| | | |
|---|---|---|
| EP | 1 816 365 | 8/2007 |
| JP | 2001-208215 | 8/2001 |
| JP | 2004-211849 | 7/2004 |
| JP | 2005-113928 | 4/2005 |
| JP | 2005-188637 | 7/2005 |
| JP | 2005-240962 | 9/2005 |
| JP | 2006-145029 | 6/2006 |
| JP | 2006-226453 | 8/2006 |

OTHER PUBLICATIONS

International Preliminary Report on Patentability and Written Opinion of the International Searching Authority mailed Apr. 8, 2010 in International (PCT) Application No. PCT/JP2008/064421.
International Search Report issued Sep. 2, 2008 in International (PCT) Application No. PCT/JP2008/064421.

* cited by examiner

*Primary Examiner* — Gregory Binda
(74) *Attorney, Agent, or Firm* — Wenderoth, Lind & Ponack, L.L.P.

(57) ABSTRACT

A constant velocity universal joint has improved sealability of the boot thereof and facilitates the positioning of the end sections of the boot in the axial direction at low cost while ensuring the strength of the outer race thereof. Protruding sections having a pointed shape at the tip ends thereof and having a triangular shape in cross section are provided on the inner peripheral surfaces of the large-diameter end section and the small-diameter end section of a boot. Sealing sections are respectively disposed annularly on the inner peripheral surfaces of the large-diameter end section and the small-diameter end section on the portions equally distant from the protruding sections on both sides thereof in the axial direction.

15 Claims, 14 Drawing Sheets

CONSTANT VELOCITY UNIVERSAL JOINT

TECHNICAL FIELD

The present invention relates to a constant velocity universal joint used for automotive drive shafts and various industrial machines to transmit rotational torque.

BACKGROUND ART

A constant velocity universal joint is roughly classified into a fixed-type constant velocity universal joint and a slide-type constant velocity universal joint. The fixed-type constant velocity universal joint allows only angular displacement and is mainly used on the wheel side of an automotive drive shaft, for example. On the other hand, the slide-type constant velocity universal joint allows angular displacement and axial displacement (plunging) and is mainly used on the differential gear side of an automotive drive shaft.

This kind of constant velocity universal joint is provided with a boot for preventing lubricating components sealed inside the joint from leaking to the outside and preventing foreign matter from intruding from the outside.

As an example of a constant velocity universal joint provided with this kind of boot, a Rzeppa-type constant velocity universal joint which is one of a fixed-type constant velocity universal joint is illustrated in FIG. 20.

This constant velocity universal joint 201 includes an outer race 202, an inner race 203, balls 204 and a cage 205 as main components, and an internal component set 206 including the inner race 203, the balls 204 and the cage 205 is accommodated and disposed inside the outer race 202.

The outer race 202 has an opening at one end thereof, and a plurality of curved track grooves 207 are formed on inner spherical surface thereof. A plurality of curved track grooves 208 are formed on the outer spherical surface of the inner race 203, and a shaft 209 is spline-fitted in the center hole 219 thereof and is prevented from coming off by means of a circlip 210. The plurality of balls 204 are disposed between the track grooves 207 of the outer race 202 and the track grooves 208 of the inner race 203, and the balls 204 are retained in the pockets 217 of the cage 205 disposed between the outer race 202 and the inner race 203.

The opening of the outer race 202 is covered with a boot 211. This boot 211 has a large-diameter end section 212, a small-diameter end section 213 and a bellows section 214 connecting the large-diameter end section 212 and the small-diameter end section 213. The large-diameter end section 212 is installed on the outer peripheral surface 220 of the opening end section 218 of the outer race 202, the small-diameter end section 213 is installed on the outer peripheral surface 221 of the shaft 209, and the respective installation portions are fixed by tightening boot bands (215 and 216).

As the structure of the installation portions of the opening end section 218 of the outer race 202 and the large-diameter end section 212 of the boot 211 or the structure of the installation portions of the shaft 209 and the small-diameter end section 213, various structures are known. Examples of the structures are illustrated in FIG. 21 and FIGS. 22A to 22C. The same portions as those illustrated in FIG. 20 and the portions having the same functions as those of the portions illustrated therein are described with the same reference numerals.

FIG. 21 illustrates an example of the structure of the installation portions of the large-diameter end section 212 of the boot 211 and the outer peripheral surface 220 of the opening end section 218 of the outer race 202. A fitting groove 225 is formed on the outer peripheral surface 220 of the opening end section 218 of the outer race 202, and a protruding section 226 is provided annularly on the inner peripheral surface 224 of the large-diameter end section 212. The large-diameter end section 212 is installed on and fixed to the opening end section 218 of the outer race 202 by fitting this protruding section 226 into the fitting groove 225 and by tightening the boot band 215 on the outer peripheral surface of the large-diameter end section 212.

With this structure, the sealability of the large-diameter end section 212 of the boot 211 is ensured. Further, since the protruding section 226 is fitted into the fitting groove 225, when the large-diameter end section 212 is installed on the opening end section 218 of the outer race 202, the positioning thereof in the axial direction is made possible. The structure of the installation portions of the large-diameter end section 212 and the opening end section 218 of the outer race 202 is also applied to the structure of the installation portions of the small-diameter end section 213 of the boot 211 and the shaft 209 illustrated in FIG. 20.

In the outer peripheral surface 220 of the opening end section 218 of the outer race 202, a tapered surface 227 is formed at the portion on the side of the opening of the outer race from the fitting groove 225, and this tapered surface 227 and the fitting groove 225 form an acute angle section 223. This acute angle section 223 bites into the inner peripheral surface 224 of the large-diameter end section 212, thereby improving the sealability of the large-diameter end section 212 and preventing the large-diameter end section 212 from coming off from the opening end section 218 of the outer race 202 (refer to Patent Document 1).

FIGS. 22A to 22C illustrate the structure of the installation portions of the opening end section 218 of the outer race 202 and the large-diameter end section 212 of the boot 211 as in the case of FIG. 21. As illustrated in FIG. 22B, a fitting groove 241 is formed on the outer peripheral surface 220 of the opening end section 218 of the outer race 202, and on the outer peripheral surface 220 of the opening end section 218 of the outer race 202, an annular protruding section 239 is formed on the side of the opening of the outer race from the fitting groove 241. As illustrated in FIG. 22A, the large-diameter end section 212 of the boot 211 has a tapered section 237, a protrusion 240, a dent 238 and a shoulder contact section 236 on the inner peripheral surface 224 thereof. With this structure, when the large-diameter end section 212 of the boot 211 is installed on the opening end section 218 of the outer race 202, the protruding section 239 of the opening end section 218 of the outer race 202 is fitted into the dent 238 as illustrated in FIG. 22C, thereby preventing the large-diameter end section 212 from coming off from the opening end section 218 of the outer race 202, the protrusion 240 is brought into close contact with the fitting groove 241 of the opening end section 218 of the outer race 202, thereby imparting sealability to the large-diameter end section 212, and the opening end section 218 of the outer race 202 is brought into contact with the shoulder contact section 236, thereby facilitating the positioning of the large-diameter end section 212 in the axial direction. Even in this prior art, the boot band 215 is tightened on the outer peripheral surface of the large-diameter end section 212 as illustrated in FIG. 22C, whereby the large-diameter end section 212 is installed on and fixed to the opening end section 218 of the outer race 202 (refer to Patent Document 2).

[Patent Document 1] Japanese Patent Application Laid-open No. 2001-208215

[Patent Document 2] Japanese Patent Application Laid-open No. 2006-226453

SUMMARY OF THE INVENTION

Problem to be solved by the Invention

In the constant velocity universal joint according to Patent Document 1, the biting amount of the acute angle section 223 into the large-diameter end section 212 of the boot 211 becomes small when the use conditions are very severe, i.e., high temperature environment, or depending on the specifications of the boot band 215, whereby the sealability may become insufficient. This problem also occurs similarly in the small-diameter end section 213 of the boot 211.

In the constant velocity universal joint according to Patent Document 2, there is a problem that processing man-hour for the outer peripheral surface 220 of the opening end section 218 of the outer race 202 may increase and that material loss (the loss of materials occurred when materials are cut) may also occur. Further, there is a fear that, in the opening end section 218 of the outer race 202, the portion in which the fitting groove 241 is formed becomes thin-walled to reduce the strength of the opening end section 218 of the outer race 202.

Under the circumstances described above, the present invention is intended to provide a constant velocity universal joint capable of improving the sealability of the boot and facilitating the positioning of the end sections of the boot in the axial direction at low cost while ensuring the strength of the outer race.

Means for solving the Problem

A constant velocity universal joint of the present invention for solving the above-mentioned problem is a constant velocity universal joint including an outer joint member having an opening section and an inner joint member accommodated inside the outer joint member and connected to the outer joint member so that torque can be transmitted thereto, in which one of the end sections of a boot is installed on the outer peripheral surface of a shaft member extending from the inner joint member, another end section of the boot is installed on the outer peripheral surface of the opening end section of the outer joint member, the protruding section formed on the inner peripheral surface of the end section of the boot is fitted into the fitting groove formed on the opening end section of the outer joint member or on the outer peripheral surface of the shaft member, and sealing sections having a pointed shape are provided annularly on the portions excluding the protruding section on the inner peripheral surface of the end section of the boot.

In this case, when the protruding section of the end section of the boot is fitted into the fitting groove formed on the outer peripheral surface of the opening end section of the outer joint member or the fitting groove formed on the outer peripheral surface of the shaft member, the sealing sections provided annularly on the inner peripheral surface of the end section of the boot are brought into close contact with the portions excluding the fitting groove on the outer peripheral surface of the opening end section of the outer joint member or the portions excluding the fitting groove on the outer peripheral surface of the shaft member. As a result, on the inner peripheral surface of the end section of the boot, on both sides of the protruding section, the close contact sections brought into close contact with the outer peripheral surface of the opening end section of the outer joint member and the sealing sections are responsible for the sealability of the end section of the boot, whereby the sealability at the end section of the boot can be improved.

In the above-mentioned invention, it is desirable that a fixing component is installed on the outer peripheral surface of the end section of the boot and that the sealing sections are provided in the range of the axial width of the fixing component.

In this case, since the sealing sections provided on the portions excluding the protruding section on the inner peripheral surface of the end section of the boot are disposed in the axial range of the axial width of the fixing component, the sealing sections directly receive a radial force (hereinafter referred to as a tightening force) from the fixing component and are rigidly brought into close contact with the portions excluding the fitting groove on the outer peripheral surface of the opening end section of the outer joint member or the portions excluding the fitting groove on the outer peripheral surface of the shaft member. Hence, the sealability of the end section of the boot can be improved remarkably.

The tip ends of the sealing sections may be formed into any desired shape, such as a rounded shape. However, it is particularly preferable that they are formed into a pointed shape.

In the case where the tip ends of the sealing sections are formed into a pointed shape as described above, when the end section of the boot is installed on the opening end section of the outer joint member or the shaft member, the interference of the end section of the boot for the opening end section of the outer joint member or the shaft member can be obtained reliably using the sealing sections. Further, after the installation, the sealing sections are rigidly brought into close contact at high surface pressure with the portions excluding the fitting groove on the outer peripheral surface of the opening end section of the outer joint member or the portions excluding the fitting groove on the outer peripheral surface of the shaft member, whereby the sealability of the end section of the boot can be improved.

It is preferred that the sealing sections be provided at a plurality of places on the portions excluding the protruding section on the inner peripheral surface of the end section of the boot.

The sealing sections provided on the inner peripheral surface of the end section of the boot are brought into close contact with the portions excluding the fitting groove on the outer peripheral surface of the opening end section of the outer joint member or the portions excluding the fitting groove on the outer peripheral surface of the shaft member whereby the sealability of the end section of the boot is improved, and this effect becomes significant by providing the sealing sections at a plurality of places on the portions excluding the protruding section on the inner peripheral surface of the end section of the boot as in the case of the present invention.

In the case where the sealing sections are provided at a plurality of places on the portions excluding the protruding section on the inner peripheral surface of the end section of the boot as in the case of the above-mentioned invention, it is desirable that the sealing sections are provided on the portions on both sides of the protruding section in the axial direction thereof on the inner peripheral surface of the end section of the boot.

The end section of the boot can be fixed to the opening end section of the outer joint member or the shaft member in a well-balanced manner by providing the sealing sections as described above. This effect becomes significant in the case where the fixing component is installed on the outer peripheral surface of the end section of the boot. The reason for this is that the tightening force from the fixing component is distributed in a well-balanced manner to the sealing sections provided on the inner peripheral surface of the end section of the boot without being partially provided to one place, and the tightening force is received by the portions excluding the fitting groove on the outer peripheral surface of the opening end section of the outer joint member or the portions excluding the fitting groove on the outer peripheral surface of the shaft member, whereby the opening end section of the outer joint member or the shaft member rigidly makes contact with the sealing sections.

It is desirable that the radial length of the sealing sections is made shorter than the radial length of the protruding section.

In this case, when the end section of the boot is installed on the opening end section of the outer joint member or the shaft member, since the radial length of the sealing sections is made shorter than the radial length of the protruding section, after the axial positioning of the end section of the boot is carried out by fitting the protruding section provided on the end section of the boot into the fitting groove formed on the outer peripheral surface of the opening end section of the outer joint member or the fitting groove formed on the outer peripheral surface of the shaft member, the sealing sections can be brought into close contact with the portions excluding the fitting groove on the outer peripheral surface of the opening end section of the outer joint member or the portions excluding the fitting groove on the outer peripheral surface of the shaft member. As a result, the workability when the end section of the boot is installed on the opening end section of the outer joint member or the shaft member can be improved.

It is desirable that the radial length of the fitting groove formed on the outer peripheral surface of the opening end section of the outer joint member or the fitting groove formed on the outer peripheral surface of the shaft member is equal to or more than the radial length of the protruding section.

In this case, when the protruding section provided on the end section of the boot is fitted into the fitting groove, since the protruding section can be entirely fitted into the fitting groove, the axial positioning of the end section of the boot on the opening end section of the outer joint member or the shaft member can be carried out securely. Further, even after the protruding section provided at the end section of the boot has been fitted into the fitting groove, the protruding section is in a state of being entirely fitted into the fitting groove, whereby the axial displacement of the end section of the boot at the opening end section of the outer joint member or the shaft member can be prevented efficiently, and sealability can be imparted to the end section of the boot. This effect becomes significant in the case where the fixing component is installed on the outer peripheral surface of the end section of the boot. The reason for this is that it is possible to avoid the situation that the tightening force of the fixing component becomes small owing to the effect of the reaction force generated when the close contact property between the protruding section of the boot and the fitting groove becomes excessive owing to the tightening force of the fixing component after the protruding section provided at the end section of the boot has been fitted into the fitting groove of the opening end section of the outer joint member or the fitting groove of the shaft member and then the fixing component has been installed on the outer peripheral surface of the end section of the boot. Further, in this case, since the tightening force of the fixing component received by the sealing sections does not become small, the portions excluding the fitting groove on the outer peripheral surface of the opening end section of the outer joint member or the portions excluding the fitting groove on the outer peripheral surface of the shaft member can be rigidly brought into close contact with the sealing sections.

It is preferred that the shape of the protruding section be conformed to the shape of the fitting groove.

Herein, "the shape is made to coincide with" means that when the protruding section is fitted into the fitting groove, no clearance is generated between the protruding section and the fitting groove, in other words, the size and outer shape of the protruding section are the same as those of the fitting groove. The protruding section can be easily fitted into the fitting groove, and the axial positioning when the end section of the boot is installed on the opening end section of the outer joint member or the shaft member can be carried out more reliably by conforming the shape of the protruding section provided on the end section of the boot to the shape of the fitting groove formed on the outer peripheral surface of the opening end section of the outer joint member or the outer peripheral surface of the shaft member as in the case of the present invention. Further, in the case of the present invention, since the protruding section is fitted into the fitting groove with no clearance therebetween, this contributes to the improvement in the sealability of the end section of the boot.

In the case where the opening end section of the outer joint member is noncylindrical, it is desirable that the inner peripheral surface of the end section of the boot installed on the outer peripheral surface of the opening end section of the outer joint member is formed into the shape in conformity with the outer shape of the opening end section of the outer joint member, and the outer peripheral surface of the opening end section of the outer joint member and the inner peripheral surface of the end section of the boot installed thereon are brought into close contact with each other with no clearance therebetween.

In the case where the opening end section of the outer joint member is noncylindrical, the sealing sections provided on the portions excluding the protruding section on the inner peripheral surface of the end section of the boot can be brought into close contact with the outer peripheral surface of the opening end section of the outer joint member along the entire circumferential length by forming the inner peripheral surface of the end section of the boot into the shape in conformity with the outer shape of the opening end section of the outer joint member and by bringing this into close contact with the opening end section of the outer joint member. Hence, the sealability of the boot can be improved even in the case where the opening end section of the outer joint member is noncylindrical.

The protruding section and the sealing sections can be provided by being integrally molded with the end section of the boot or can be provided separately from the end section of the boot. in the case where the protruding section and the sealing sections are provided by being integrally molded with the end section of the boot, since it is not necessary to use other components as the protruding section and the sealing sections, the number of components can be reduced, and the processing cost for the end section of the boot can be reduced.

It is preferred that the end section of the boot installed on the outer joint member have a shoulder section protruding in the inner diametrical direction on the portions excluding the protruding section on the inner peripheral surface thereof, and the opening end section of the outer joint member be brought into contact with the shoulder section.

In this case, when one of the end sections of the boot is installed on the opening end section of the outer joint member, the axial positioning of the end section of the boot can be carried out by fitting the protruding section provided on the inner peripheral surface of the end section of the boot into the fitting groove formed on the outer peripheral surface of the opening end section of the outer joint member and can also be carried out by making the opening end section of the outer joint member into contact with the shoulder section of the boot. For this reason, the workability when the one end section of the boot is installed on the opening end section of the outer joint member can be improved remarkably. Further, the shoulder section provided on the inner peripheral surface of the end section of the boot installed on the outer joint member can prevent the boot from being displaced toward the opposite side of the opening side of the outer joint member after the end section of the boot has been installed on the opening end section of the outer joint member.

In the above-mentioned present invention, the shoulder section provided on the inner peripheral surface of the end section of the boot installed on the outer joint member can be provided by being integrally molded with the end section of the boot or can be provided separately from the end section of the boot. In the case where the shoulder section is provided by being integrally molded with the end section of the boot, since it is not necessary to use other components as the shoulder section, the number of components can be reduced, and the processing cost for the end section of the boot can be reduced.

Effect of the Invention

In the constant velocity universal joint according to the present invention, since the sealing sections having a protruding shape are provided annularly on the portions excluding the protruding section on the inner peripheral surface of at least one of the end sections of the boot, and the sealing sections are brought into close contact with the portions excluding the fitting section on the outer peripheral surface of the opening end section of the outer joint member or the portions excluding fitting groove on the outer peripheral surface of the shaft member, the sealability of the boot can be improved. For this reason, the fitting groove which is formed at the opening end section of the outer joint member or the outer peripheral surface of the shaft member and onto which the protruding section provided on the inner peripheral surface of the end section of the boot is fitted is not required to be processed into a complicated shape in order to improve the sealability of the end section of the boot. Hence, the processing man-hour for the opening end section of the outer joint member and the shaft member can be reduced, and the workability of the processing work can be improved. As a result, the processing cost incurred when the fitting groove is formed on the outer peripheral surface of the opening end section of the outer joint member or the outer peripheral surface of the shaft member and the material loss occurring when the members are cut during the processing can be also reduced. Further, since the material loss during the processing of the opening end section of the outer joint member is reduced, the strength of the outer joint member can be obtained securely.

Figure 1A:
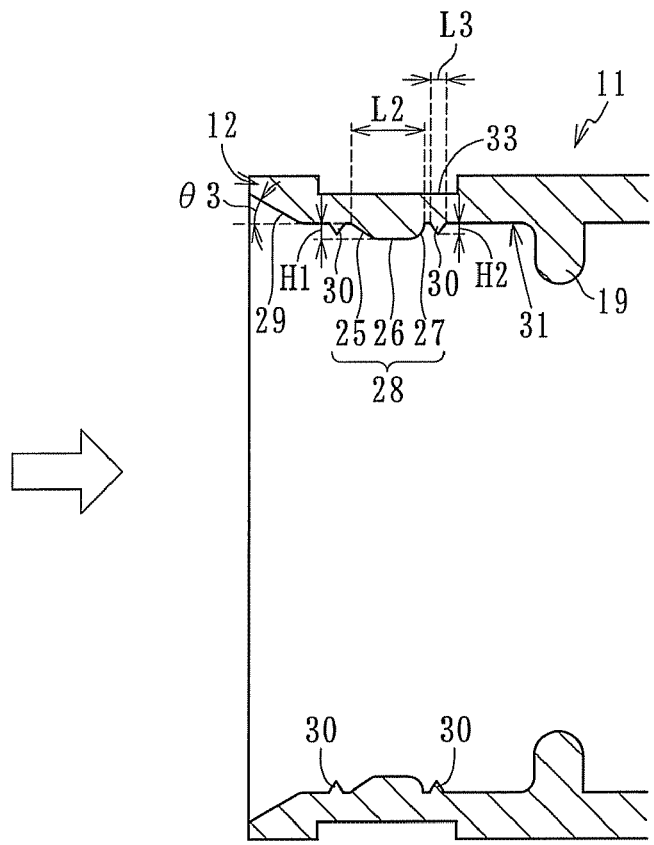
FIG. 1A An enlarged view illustrating the large-diameter end section of the boot illustrated in FIG. 7.

DESCRIPTION OF REFERENCE NUMERALS 1 fixed-type constant velocity universal joint (BJ)
2, 92 outer joint member (outer race)
9, 99 shaft (shaft member)
11, 100 bellows-like boot
12, 101 large-diameter end section
13, 102 small-diameter end section
15, 16, 105, 106 boot band
18, 98 opening end section (outer race)
19, 104 shoulder section (large-diameter end section)
20, 107 outer peripheral surface (outer race)
21, 111 fitting groove (outer race)
28, 119 protruding section (large-diameter end section)
30, 123 sealing sections (large-diameter end section)
31, 108 inner peripheral surface (large-diameter end section)
33, 116 band fitting groove (large-diameter end section)
36, 125 fitting groove (shaft)
41, 130 protruding section (small-diameter end section)
45, 134 sealing section (small-diameter end section)
46, 117 band fitting groove (small-diameter end section)
47, 110 inner peripheral surface (small-diameter end section)
91 tripod type constant velocity universal joint (TJ)

DETAILED DESCRIPTION OF THE INVENTION

Embodiments according to the present invention are described below with reference to the accompanying drawings.

A first embodiment according to the present invention is illustrated in FIGS. 1A to 7.

Figure 7:
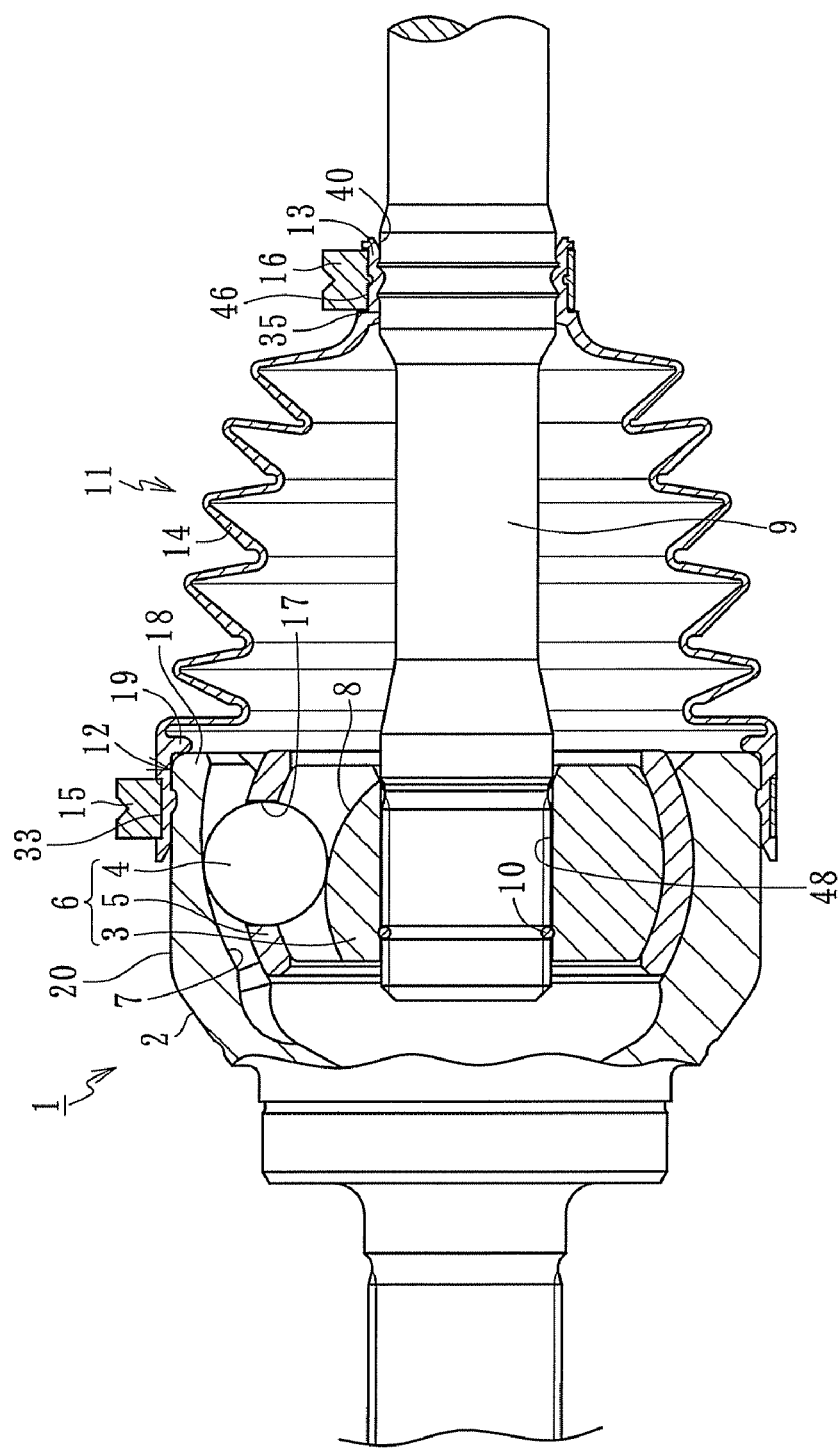
FIG. 7 A sectional view illustrating a constant velocity universal joint according to a first embodiment of the present invention.

FIG. 7 illustrates a Rzeppa-type constant velocity universal joint serving as a fixed-type constant velocity universal joint according to the present invention. This constant velocity universal joint 1 has main components including an outer race 2 serving as an outer joint member, an inner race 3 serving as an inner joint member, balls 4, and a cage 5, and an internal component set 6 including the inner race 3, the balls 4, and the cage 5 is accommodated and disposed inside the outer race 2.

The outer race 2 has an opening on one end thereof, and a plurality of curved track grooves 7 are formed on the inner spherical surface thereof. A plurality of curved track grooves 8 are formed on the outer spherical surface of the inner race 3, and a shaft 9 is spline-fitted in the center hole 48 thereof and is prevented from coming off by means of a circlip 10. The plurality of balls 4 are interposed between the track grooves 7 of the outer race 2 and the track grooves 8 of the inner race 3, and the balls 4 are retained in pockets 17 of the cage 5 disposed between the outer race 2 and the inner race 3.

The opening section of the outer race 2 is covered with a boot 11 made of thermoplastic polyester elastomer. This boot 11 has a large-diameter end section 12, a small-diameter end section 13 and a bellows-like intermediate section 14 connecting the large-diameter end section 12 and the small-diameter end section 13. The large-diameter end section 12 is installed on the outer peripheral surface 20 of the opening end section 18 of the outer race 2, the small-diameter end section 13 is installed on the outer peripheral surface 35 of the shaft 9, and the respective installation portions are tightened and fixed by mounting boot bands (15, 16) serving as fixing components in a band fitting groove 33 formed on the outer peripheral surface of the large-diameter end section 12 and a band fitting groove 46 formed on the outer peripheral surface of the small-diameter end section 13, respectively. The above-mentioned respective installation portions are described below.

First, the installation portions of the large-diameter end section 12 of the boot 11 and the opening end section 18 of the outer race 2 are described with reference to FIGS. 1A to 3 and FIG. 7.

Figure 2:
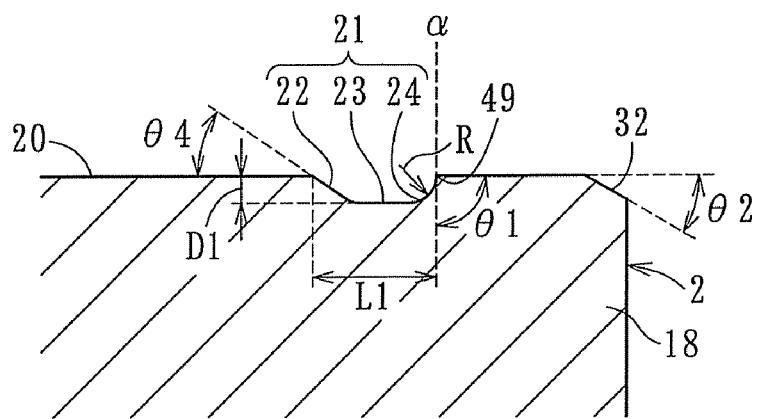
FIG. 2 An enlarged view illustrating the opening end section of the outer race illustrated in FIG. 7.

FIG. 2 is an enlarged view illustrating the opening end section 18 of the outer race 2 illustrated in FIG. 7. A fitting groove 21 is formed on the outer peripheral surface 20 of the opening end section 18 of the outer race 2. This fitting groove 21 has a cross-sectional shape in which a tapered section 22, a bottom section 23, and a curved surface section 24 having a curvature radius of R are arranged continuously in this order from the opposite side of the opening of the outer race. Since the fitting groove 21 is formed into this shape, the processing man-hour for the outer peripheral surface 20 of the opening end section 18 of the outer race 2 can be reduced, and processing workability can be improved. As a result, the processing cost for forming the fitting groove 21 on the outer peripheral surface 20 of the opening end section 18 of the outer race 2 and material loss occurring when components are cut during the processing can be reduced. Further, since the range in the axial direction can be reduced in which the wall thickness is reduced by forming the fitting groove 21 in the opening end section 18 of the outer race 2, the strength of the outer race 2 is not reduced.

The angle ($\theta 4$ in the figure) formed by the tapered section 22 with respect to the outer peripheral surface 20 of the outer race 2 extending continuously at the large-diameter side portion of the tapered section 22 is defined to be 25° to 30°. When the angle is less than 25°, positioning property in the axial direction is reduced. When the angle is more than 30°, processing workability is reduced. In addition, the curvature radius R of the curved surface section 24 is defined to be 1 mm or more. When the curvature radius R is less than 1 mm, the curved surface section 24 becomes too small, and the service life of a turning tool is reduced.

Figure 3:
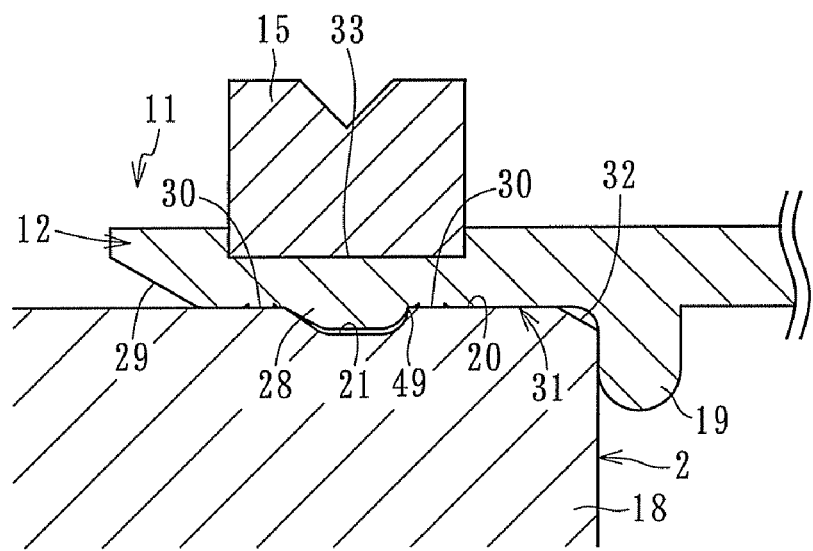
FIG. 3 An enlarged view illustrating the installation portions of the opening end section of the outer race and the large-diameter end section of the boot illustrated in FIG. 7.

The angle ($\theta 1$ in the figure) formed by the tangent line ($\alpha$ in the figure) in the large-diameter side portion of the curved surface section 24 with respect to the outer peripheral surface 20 of the outer race 2 extending continuously from the large-diameter side portion of the curved surface section 24 is defined to be a right angle. In this case, as illustrated in FIG. 3, when the large-diameter end section 12 of the boot is installed on the opening end section 18 of the outer race 2, the portion (denoted by numeral 49 in the figure) in which the tangent line $\alpha$ (see FIG. 2) in the large-diameter side portion of the curved surface section 24 intersects at a right angle the outer peripheral surface 20 of the outer race 2 extending continuously from the large-diameter side portion of the curved surface section 24 bites into the inner peripheral surface 31 of the large-diameter end section 12 of the boot 11. Accordingly, the large-diameter end section 12 is prevented from coming off from the opening end section 18 of the outer race 2. In the case where the angle $\theta 1$ (see FIG. 2) formed by the tangent line a in the large-diameter side portion of the curved surface section 24 with respect to the outer peripheral surface 20 of the outer race 2 extending continuously from the large-diameter side portion of the curved surface section 24 is formed to have an acute angle by inclining the outer peripheral surface 20 of the outer race 2 extending continuously from the large-diameter side portion of the curved surface section 24 such that the diameter thereof is reduced in a direction toward the opening end section 18 of the outer race 2, this acute section deeply bites into the inner peripheral surface of the large-diameter end section, whereby the above-mentioned effect becomes significant. The inclination angle is desirably 0° to 5°. When the angle is more than 5°, the strength of the outer race 2 may be reduced in some cases.

A tapered section 32 is formed at the tip end section of the opening end section 18 of the outer race 2 such that the diameter thereof is reduced toward the opening section of the outer race. When the opening end section 18 of the outer race is press-fitted into the large-diameter end section 12 of the boot 11 by means of this tapered section 32, the tapered section 32 performs a guiding function, thereby facilitating the press-fitting work. As a result, the workability when the large-diameter end section 12 is installed on the outer race 2 can be improved.

The inclination angle (θ2 in the figure) of the tapered section 32 is defined to be 25° to 60°. When the inclination angle is less than 25°, the axial length of the tapered section 32 becomes long and the portion in which the wall thickness of the opening end section 18 of the outer race 2 becomes small is increased, resulting in reducing the strength of the outer race 2. On the other hand, when the inclination angle θ2 is more than 60°, the component force in the radial force becomes small, and hence, when the opening end section 18 of the outer race 2 is press-fitted into the large-diameter end section 12, the tapered section 32 does not perform the guiding function.

Figure 1B:
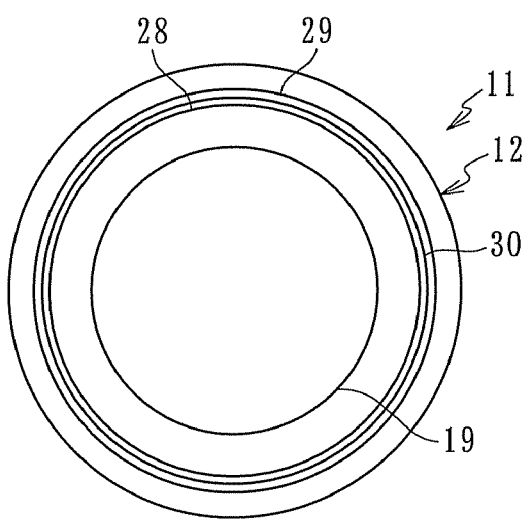
FIG. 1B A view on arrow taken in the direction of the hollow arrow illustrated in FIG. 1A.

FIG. 1A is an enlarged view illustrating the large-diameter end section 12 of the boot 11 illustrated in FIG. 7. FIG. 1B is an arrow view of the large-diameter end section 12 of the boot 11 illustrated in FIG. 1A and taken from the side of the hollow arrow illustrated in the figure.

On the inner peripheral surface 31 of the large-diameter end section 12 of the boot 11, a tapered section 29 is formed at the tip end section of the large-diameter end section 12 along the entire circumferential length such that the diameter of the tapered section 29 is reduced toward the central side of the boot (toward the right side in the figure), and on the central side of the boot from this tapered section 29, two annular sealing sections 30, an annular protruding section 28, and an annular shoulder section 19 are provided.

The outer shape of the protruding section 28 is the same as that of the fitting groove 21 of the opening end section 18 of the outer race 2 illustrated in FIG. 2, and the protruding section 28 has a cross-sectional shape in which a tapered section 25 formed such that its diameter is reduced toward the central side of the boot, a flat section 26, and a curved surface section 27 formed such that its diameter is increased toward the central side of the boot are formed continuously in this order toward the central side of the boot. When the large-diameter end section 12 is installed on the opening end section 18 of the outer race 2 as illustrated in FIG. 3, the protruding section 28 is fitted into the fitting groove 21 formed on the outer peripheral surface 20 of the opening end section 18 of the outer race 2, whereby the large-diameter end section 12 can be positioned in the axial direction. Hence, the workability when the large-diameter end section 12 is installed on the opening end section 18 of the outer race 2 can be improved, and sealability can also be imparted to the large-diameter end section 12. Further, even after the protruding section 28 of the large-diameter end section 12 has been fitted into the fitting groove 21 formed in the opening end section 18 of the outer race 2, displacement of the large-diameter end section 12 in the axial direction can be prevented.

The axial length (L2 in the figure) of the root section of the protruding section 28 is made equal to the axial length (L1 in the figure) on the outer diameter side of the fitting groove 21 formed on the outer peripheral surface 20 of the opening end section 18 of the outer race 2 illustrated in FIG. 2. When L1<L2, the protruding section 28 cannot be fitted into the fitting groove 21. When L1>L2, although the protruding section 28 can be fitted into the fitting groove 21, a clearance is generated in the axial direction between the protruding section 28 and the fitting groove 21 after the fitting, whereby the protruding section 28 cannot reliably prevent the axial displacement of the large-diameter end section 12.

In addition, the radial length (D1 in the figure) of the fitting groove 21 formed on the outer peripheral surface 20 of the opening end section 18 of the outer race 2 illustrated in FIG. 2 is defined to be equal to or more than the radial length (H1 in the figure) of the protruding section 28 provided on the inner peripheral surface 31 of the large-diameter end section 12 of the boot 11 illustrated in FIG. 1A. In this case, when the protruding section 28 provided on the large-diameter end section 12 of the boot 11 is fitted into the fitting groove 21, since the protruding section 28 can be entirely fitted into the fitting groove 21, the axial positioning of the large-diameter end section 12 at the opening end section 18 of the outer race 2 can be carried out securely. Further, since the protruding section 28 is in a state of being entirely fitted into the fitting groove 21 even after the protruding section 28 provided on the large-diameter end section 12 has been fitted into the fitting groove 21, the axial displacement of the large-diameter end section 12 at the opening end section 18 of the outer race 2 can be prevented, and sealability can be imparted to the large-diameter end section 12.

This effect becomes significant in the case where the boot band 15 serving as a fixing component is fitted into the band fitting groove 33 formed on the outer peripheral surface of the large-diameter end section 12 as in the case of this embodiment (see FIG. 3). The reason for this is that it is possible to solve the problem that the tightening force of the boot band 15 becomes small owing to the effect of the reaction force generated when the close contact property between the protruding section 28 of the large-diameter end section 12 and the fitting groove 21 of the outer race 2 becomes excessive owing to the tightening force of the boot band 15 after the protruding section 28 provided on the large-diameter end section 12 has been fitted into the fitting groove 21 of the opening end section 18 of the outer race 2 and then the boot band 15 has been installed in the band fitting groove 33 formed on the outer peripheral surface of the large-diameter end section 12. Further, in this case, since the tightening force of the boot band 15, received by the sealing sections 30 described later and relating to the sealability of the large-diameter end section 12, does not become small, the portions excluding the fitting groove 21 on the outer peripheral surface 20 of the opening end section 18 of the outer race 2 can be rigidly brought into close contact with the sealing sections 30.

The two sealing sections 30 have a triangular shape in cross section and are respectively provided at positions equally distant from the protruding section 28 in the axial direction.

As illustrated in FIG. 3, the sealing sections 30 are brought into close contact with the outer peripheral surface of the opening end section 18 of the outer race 2, and hence the sealability of the large-diameter end section 12 of the boot 11 can be improved. This effect becomes significant by providing the sealing sections 30 at a plurality of places on the portions excluding the protruding section 28 on the inner peripheral surface 31 of the large-diameter end section of the boot 11 as in the case of this embodiment. In addition, in the case of this embodiment, since the two sealing sections 30 are provided on both sides of the protruding section 28, the large-diameter end section 12 can be fixed to the opening end section 18 of the outer race 2 in a well-balanced manner. Further, in the case of this embodiment, since the boot band 15 is fitted into the band fitting groove 33 formed on the outer peripheral surface of the large-diameter end section 12, the tightening force from the boot band 15 is distributed by means by the two sealing sections 30 provided on the inner peripheral surface 31 of the large-diameter end section 12 in a well-balanced manner and applied to the opening end section 18 of the outer race 2. Hence, the large-diameter end section 12 can be fixed to the opening end section 18 of the outer race 2 in a well-balanced manner in comparison with a case in which the two sealing sections 30 are provided on one side of the protruding section 28 in the axial direction or a case in which the boot band 15 is not installed on the outer peripheral surface of the large-diameter end section 12. Further, since the sealing sections 30 are rigidly brought into close contact with the opening end section 18 of the outer race 2, this fixed state can be strengthened. Note that, the sealing sections 30 are rigidly brought into close contact with the opening end section 18 of the outer race 2, and hence the sealability of the large-diameter end section 12 can be improved.

The radial length (H2 in the figure) of the sealing sections 30 is made shorter than the radial length (H1 in the figure) of the protruding section 28. In the case where the radial length H2 of the sealing sections 30 is made shorter than the radial length H1 of the protruding section 28 as described above, when the large-diameter end section 12 of the boot 11 is installed on the outer peripheral surface 20 of the opening end section 18 of the outer race 2, the protruding section 28 of the large-diameter end section 12 is fitted into the fitting groove 21 of the opening end section 18 of the outer race 2 and the axial positioning of the large-diameter end section 12 is carried out, and then the sealing sections can be brought into close contact with the portions excluding the fitting groove 21 on the outer peripheral surface 20 of the opening end section 18 of the outer race 2. As a result, the workability when the large-diameter end section 12 of the boot 11 is installed on the opening end section 18 of the outer race 2 can be improved, and the sealability of the large-diameter end section 12 can also be improved.

The radial length H2 of the sealing sections 30 is defined to be 0.3 to 1.0 mm. When the radial length H2 of the sealing sections 30 is less than 0.3 mm, the sealing sections 30 are too small. Accordingly, when the sealing sections 30 are brought into close contact with the portions excluding the fitting groove 21 on the outer peripheral surface 20 of the opening end section 18 of the outer race 2 as illustrated in FIG. 3, the close contact property is insufficient, and sufficient sealability cannot be imparted to the large-diameter end section 12. On the other hand, when the radial length H2 of the sealing sections 30 is more than 1.0 mm, the sealing sections 30 are too large, whereby the installation property when the large-diameter end section 12 is installed on the opening end section 18 of the outer race 2 is degraded.

The axial length (L3 in the figure) of the root sections of the sealing sections 30 is defined to be 0.5 to 1.5 mm. When the length L3 of the root sections of the sealing sections 30 is less than 0.5 mm, the rigidity (resistance to deformation) of the sealing sections 30 is reduced, and the sealing sections 30 cannot be sufficiently brought into close contact with the portions excluding the fitting groove 21 on the outer peripheral surface 20 of the opening end section 18 of the outer race 2 in the state illustrated in FIG. 3, whereby sufficient sealability cannot be imparted to the large-diameter end section 12. On the other hand, when the axial length L3 of the root sections of the sealing sections is more than 1.5 mm, the axial length of the sealing sections 30 is too long, and it is difficult to provide the sealing sections 30 on the portions excluding the protruding section 28 on the inner peripheral surface 31 of the large-diameter end section 12. Further, when the sealing sections 30 are brought into close contact with the portions excluding the fitting groove 21 on the outer peripheral surface 20 of the opening end section 18 of the outer race 2, the area receiving the radial force (for example, the tightening force of the boot band 15) applied to the sealing sections 30 becomes large, and the surface pressure of the sealing sections 30 becomes small, whereby the sealing sections 30 cannot be brought into close contact with the portions with a sufficient force, and sufficient sealability cannot be imparted to the large-diameter end section 12.

The tip ends of the sealing sections 30 are formed into a pointed shape. In the case where the tip ends of the sealing sections 30 are formed into a pointed shape as described above, when the sealing sections 30 are brought into close contact with the portions excluding the fitting groove 21 on the outer peripheral surface 20 of the opening end section 18 of the outer race 2, the interference of the large-diameter end section 12 for the opening end section 18 of the outer race 2 can be obtained reliably at the sealing sections 30, and the sealing sections 30 are brought into close contact at high surface pressure with the portions excluding the fitting groove 21 on the outer peripheral surface 20 of the opening end section 18 of the outer race 2, whereby the sealability of the large-diameter end section 12 can be improved. Further, in the case where the tip ends of the sealing sections 30 are formed into a pointed shape, when the opening end section 18 of the outer race 2 is press-fitted into the large-diameter end section 12, the contact area between the opening end section 18 of the outer race 2 and the sealing sections 30 of the large-diameter end section 12 is small, whereby the press-fitting work is facilitated.

When the opening end section 18 of the outer race 2 illustrated in FIG. 2 is press-fitted into the large-diameter end section 12 of the boot 11, the tapered section 29 performs a guiding function, and facilitates the press-fitting work.

The inclination angle ($\theta 3$ in the figure) of the tapered section 29 is defined to be 20° to 60°. When the inclination angle $\theta 3$ is less than 20°, the axial length of the tapered section 29 becomes long, whereby the compactness is impaired, and unnecessary materials for the large-diameter end section 12 may increase. On the other hand, when the inclination angle is more than 60°, the component force in the radial direction becomes small, and the tapered section 29 does not sufficiently perform the function for guiding the above-mentioned opening end section 18 of the outer race 2.

As illustrated in FIG. 3, since the opening end section 18 of the outer race 2 is press-fitted into the large-diameter end section 12 and made contact with the shoulder section 19 provided on the inner peripheral surface 31 of the large-diameter end section 12, the positioning of the large-diameter end section 12 on the opening end section 18 of the outer race is further facilitated. As a result, the workability when the large-diameter end section 12 is installed on the opening end section 18 of the outer race 2 can be improved. In addition, even after the large-diameter end section 12 has been installed on the opening end section 18 of the outer race 2, the large-diameter end section 12 can be prevented from being displaced in the axial direction toward the opposite side of the opening section of the outer race at the opening end section 18 of the outer race 2 owing to the shoulder section 19.

Thermoplastic polyester elastomer is used as the material of the boot 11. In this case, an elastomer material denoted by Type D (JIS K6253) durometer hardness of 35 to 50 (hardness is higher as a value is larger) is used. When the Type D durometer hardness is less than 35, there occurs a problem that the heat resistance and rotational expansibility (resistance to expansion of the boot when the joint rotates) of the boot 11 are reduced. When the Type D durometer hardness is more than 50, there occurs a problem that the fatigability (resistance to cracking during use) and abrasiveness (durability against contact friction with other components) of the boot 11 are reduced. In both cases, the boot 11 does not perform its function. Type described herein means the type of a hardness tester.

Next, the installation portions of the small-diameter end section 13 of the boot 11 and the shaft 9 serving as a shaft member are described with reference to FIGS. 4 to 6 and FIG. 7.

Figure 4:
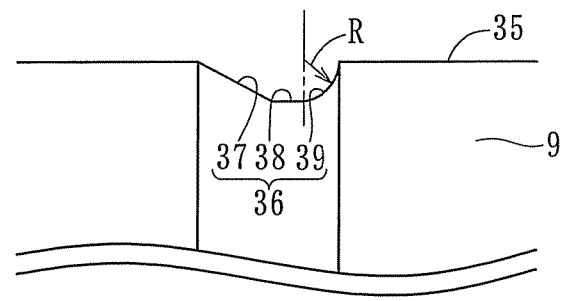
FIG. 4 A front view illustrating the shaft illustrated in FIG. 7.

As illustrated in FIG. 4, a fitting groove 36 is formed around the entire circumference on the outer peripheral surface 35 of the shaft 9. The outer shape of this fitting groove 36 is the same as that of the fitting groove 21 of the opening end section 18 of the outer race 2 illustrated in FIG. 2, and the fitting groove 36 has a cross-sectional shape in which a tapered section 37 formed such that its diameter is reduced toward the central side of the shaft (right side of the figure), a bottom section 38, and a curved surface section 39 having a curvature radius of R and formed such that its diameter is increased toward the central side of the shaft are arranged continuously in this order toward the central side of the shaft. Since the outer shape of the fitting groove 36 is the same as that of the fitting groove 21 formed at the opening end section 18 of the outer race 2 illustrated in FIG. 2, the detailed descriptions of the operation and effect thereof are omitted.

Figure 5:
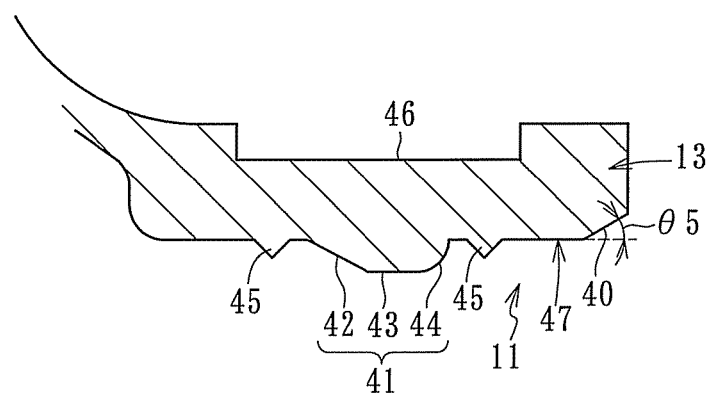
FIG. 5 An enlarged view illustrating the small-diameter end section of the boot illustrated in FIG. 7.

Further, as illustrated in FIG. 5, on the inner peripheral surface 47 of the small-diameter end section 13 of the boot 11, at the tip end section thereof, a tapered section is formed around the entire circumference such that its diameter is reduced toward the central side of the boot (left side in the figure), and two annular sealing sections 45 and an annular protruding section 41 are provided on the central side of the boot from this tapered section 40.

When the shaft 9 is press-fitted from the side of the tip end section of the small-diameter end section 13 into the small-diameter end section 13, the tapered section 40 performs a guiding function. Hence, the assembling property (workability during assembling) of the constant velocity universal joint 1 can be improved.

The protruding section 41 has a cross-sectional shape in which a tapered section 42 formed such that its diameter is reduced toward the opposite central side of the boot (right side in the figure), a flat section 43, and a curved surface section 44 formed such that its diameter is increased toward the opposite central side of the boot are arranged continuously in this order from the central side of the boot. The outer shape of the protruding section 41 is the same as that of the protruding section 28 provided on the inner peripheral surface 31 of the large-diameter end section 12 of the boot 11 illustrated in FIG. 1A, and the protruding sections are also the same in operation and effect. Therefore, the detailed descriptions thereof are omitted.

Figure 6:
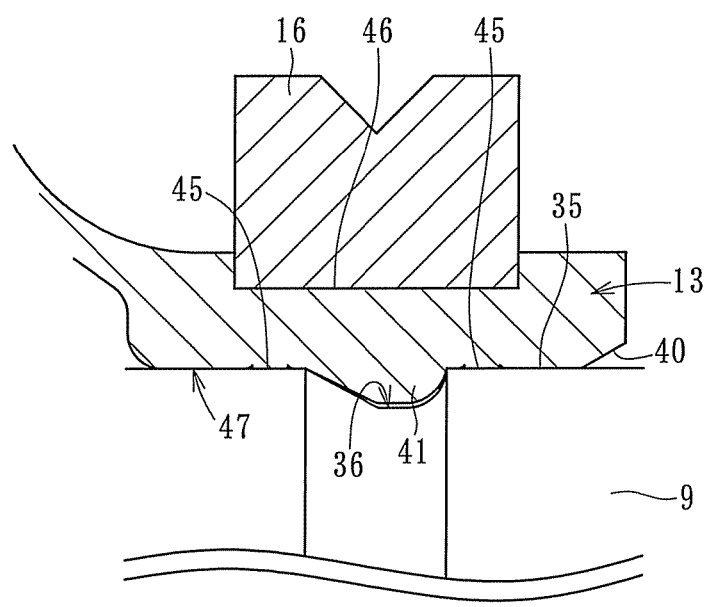
FIG. 6 An enlarged view illustrating the installation portions of the shaft and the small-diameter end section of the boot illustrated in FIG. 7.

The two sealing sections 45 are respectively provided at positions equally distant from the protruding section 41 in the axial direction. The shape of the sealing sections 45 is the same as that of the sealing sections 30 provided on the inner peripheral surface 31 of the large-diameter end section 12 illustrated in FIG. 1A, and the sealing sections are also the same in operation and effect. Therefore, the detailed descriptions thereof are omitted. As illustrated in FIG. 6, the operation and effect of the sealing sections 45 and the operation and effect of the protruding sections 41 described above become significant by fitting the boot band 16 serving as a fixing component into the band fitting groove 46 formed on the outer peripheral surface of the small-diameter end section 13. Since this principle is the same as that in the case where the boot band 15 is fitted into the band fitting groove 33 of the large-diameter end section 12 as illustrated in FIG. 3, the detailed descriptions thereof are omitted.

The inclination angle ($\theta 5$ in the figure) of the tapered section 40 formed at the tip end section of the small-diameter end section 13 is defined to be 20° to 60°. When the inclination angle $\theta 5$ is less than 20°, the axial length of the tapered section 40 becomes long. Accordingly, thin wall portions increase in the small-diameter end section 13, the compactness is impaired, and unnecessary materials for the small-diameter end section 13 may increase. On the other hand, when the inclination angle is more than 60°, the component force in the radial direction becomes small, and the guiding function of the tapered section 40 is not performed sufficiently when the shaft 9 is press-fitted from the tip end section of the small-diameter end section 13 into the small-diameter end section 13.

In this embodiment, the protruding section 28 and the sealing sections 30 are provided in the range of the axial width of the boot band 15 serving as a fixing component on the inner peripheral surface 31 of the large-diameter end section 12 of the boot 11 (see FIG. 3), and the protruding section 41 and the sealing sections 45 are provided in the range of the axial width of the boot band 16 on the inner peripheral surface 47 of the small-diameter end section 13 of the boot 11 (see FIG. 6).

In this case, the protruding sections (28, 41) are disposed on the portions that directly receive the tightening forces of the boot bands (15, 16). Hence, after the protruding sections (28, 41) have been fitted into the fitting groove 21 formed on the outer peripheral surface 20 of the opening end section 18 of the outer race 2 and the fitting groove 36 formed on the outer peripheral surface 35 of the shaft 9, respectively, the tightening forces of the boot bands (15, 16) can prevent the protruding sections (28, 41) from coming off from the fitting grooves (21, 36). As a result, the axial displacements of the large-diameter end section 12 and the small-diameter end section 13 can be prevented securely. In addition, since the sealing sections (30, 45) are also disposed on the portions that directly receive the tightening forces of the boot bands (15, 16), rigid close contact is attained on the portions excluding the fitting groove 21 on the outer peripheral surface 20 of the opening end section 18 of the outer race 2 and on the portions excluding the fitting groove 36 on the outer peripheral surface 35 of the shaft 9. Hence, the sealability of the large-diameter end section 12 and the small-diameter end section 13 can be improved. For those reasons, in this embodiment, the sealing property of the boot 11 can be improved and the axial displacement of the boot 11 after the boot 11 has been installed on the outer race 2 and the shaft 9 can be prevented reliably in comparison with the case in which the protruding section 28 and the sealing sections 30 are not provided in the range of the axial width of the boot band 15 serving as a fixing component on the inner peripheral surface 31 of the large-diameter end section 12 of the boot 11, and the protruding section 41 and the sealing sections 45 are not provided in the range of the axial width of the boot band 16 on the inner peripheral surface 47 of the small-diameter end section 13 of the boot 11.

Further, in this embodiment, since the shapes of the fitting groove 21 of the opening end section 18 of the outer race 2 and the fitting groove 36 of the shaft 9 can be simplified, the processability of the outer peripheral surface 20 of the opening end section 18 of the outer race 2 and the outer peripheral surface 35 of the shaft 9 can be improved.

Figure 23A:
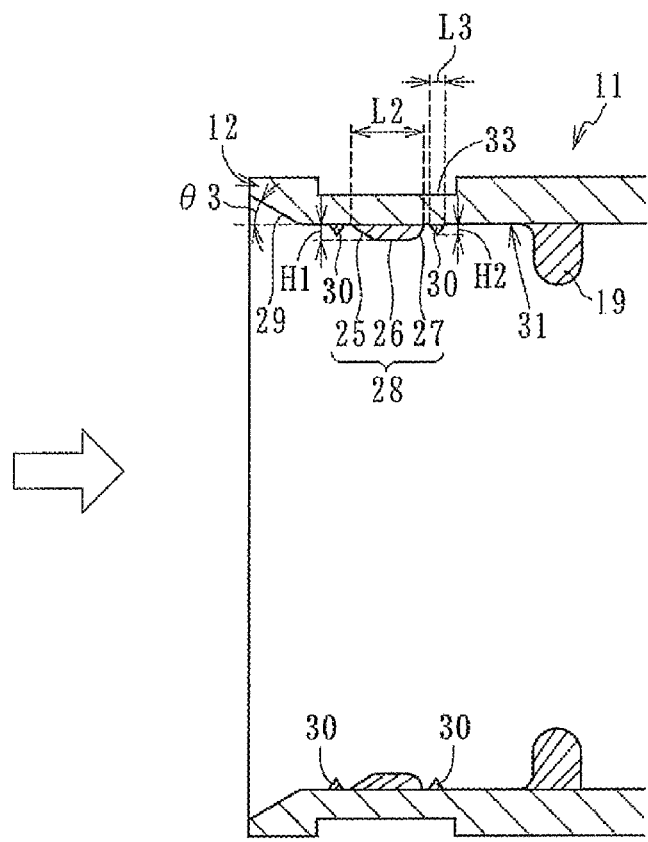
FIG. 23A An enlarged view illustrating an alternate version of the large-diameter end section of the boot illustrated in FIG. 7.
Figure 23B:
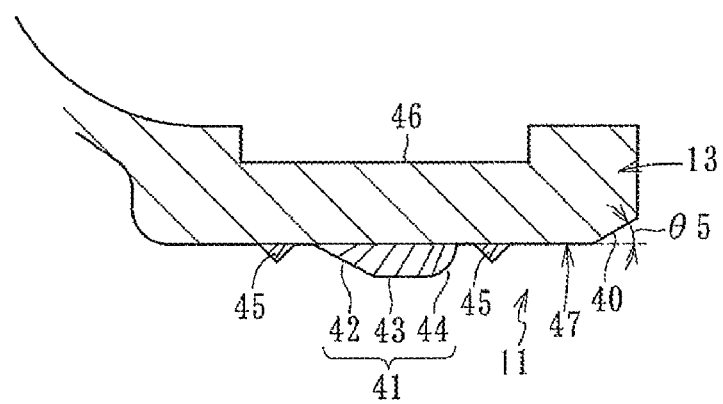
FIG. 23B An enlarged view illustrating an alternate version of the small-diameter end section of the boot illustrated in FIG. 7.

The protruding section 28 and the sealing sections 30 provided on the inner peripheral surface 31 of the large-diameter end section 12 of the boot 11 illustrated in FIG. 1A and the protruding section 41 and the sealing sections 45 provided on the inner peripheral surface 47 of the small-diameter end section 13 of the boot 11 illustrated in FIG. 5 are provided by being integrally molded with the large-diameter end section 12 and the small-diameter end section 13 of the boot, respectively. In this case, since it is not necessary to use other components as the protruding sections and the sealing sections, the number of components can be reduced, and the processing cost for the end sections (large-diameter end section 12 and small-diameter end section 13) of the boot 11 can be reduced. However, as illustrated in FIGS. 23A and 23B, the protruding section 28 and the sealing sections 30 provided on the inner peripheral surface 31 of the large-diameter end section 12 of the boot 11 and the protruding section 41 and the sealing sections 45 provided on the inner peripheral surface 47 of the small-diameter end section 13 of the boot 11 can be provided by being separate from the large-diameter end section 12 and the small-diameter end section 13 of the boot 11, respectively.

Moreover, the shoulder section 19 provided on the inner peripheral surface 31 of the large-diameter end section 12 of the boot 11 is also provided by being integrally molded with the large-diameter end section 12. In this case, since it is not necessary to use another component as the shoulder section 19, the number of components can be reduced, and the processing cost for the large-diameter end section 12 can be reduced. However, as illustrated in FIG. 23A, the shoulder section 19 can be provided by being separate from the large-diameter end section 12 of the boot 11.

The shapes of the fitting grooves (21, 36) formed on the outer peripheral surface 20 of the opening end section 18 of the outer race 2 and the outer peripheral surface 35 of the shaft 9, and the shapes of the protruding sections (28, 41) and the sealing sections (30, 45) provided on the inner peripheral surface 31 of the large-diameter end section 12 of the boot 11 and the inner peripheral surface 47 of the small-diameter end section 13 of the boot 11 can be arbitrarily changed. Embodiments relating thereto are described below.

FIGS. 8 to 13 illustrate a second embodiment of the present invention. In this embodiment, the same portions as those of the first embodiment illustrated in FIGS. 1A to 7 and components having the same functions as those of the components illustrated therein are denoted by the same numerals and their detailed descriptions are omitted.

First, the installation portions of the large-diameter end section 12 of the boot 11 and the opening end section 18 of the outer race 2 are described with reference to FIGS. 8 to 10.

Figure 8:
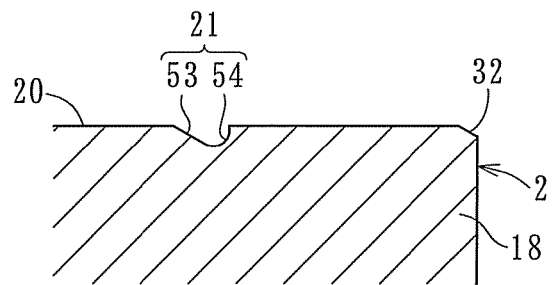
FIG. 8 A sectional view illustrating the opening end section of an outer race according to a second embodiment of the present invention.

FIG. 8 illustrates the opening end section 18 of the outer race 2, and a fitting groove 21 is formed on the outer peripheral surface 20 thereof. This fitting groove 21 has a cross-sectional shape in which a tapered section 53 formed such that its diameter is reduced toward the opening section of the outer race and a curved surface section 54 formed such that its diameter is increased toward the opening section of the outer race are arranged continuously in this order from the opposite side of the opening section of the outer race.

Figure 9:
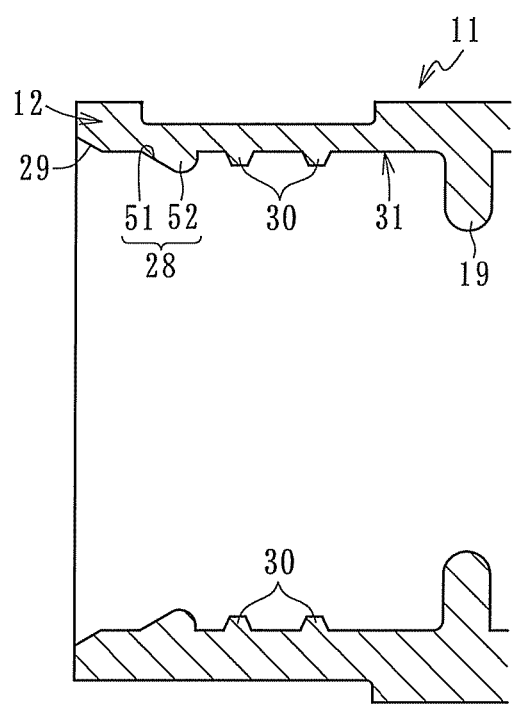
FIG. 9 A sectional view illustrating the large-diameter end section of a boot according to the second embodiment of the present invention.
Figure 10:
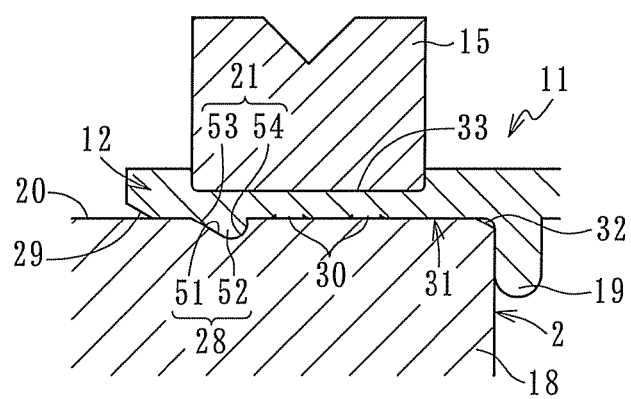
FIG. 10 A sectional view illustrating a state in which the large-diameter end section of the boot illustrated in FIG. 9 is installed on the opening end section of the outer race illustrated in FIG. 8.

FIG. 9 illustrates the large-diameter end section 12 of the boot 11, a protruding section 28 is provided on the inner peripheral surface 31 thereof, and this protruding section 28 has a cross-sectional shape in which a tapered section 51 formed such that its diameter is reduced toward the central side of the boot (right side in the figure) and a curved surface section 52 formed such that its diameter is increased toward the central side of the boot are arranged continuously in this order toward the central side of the boot. Further, two sealing sections 30 having an inverted trapezoidal shape in cross section are provided on the inner peripheral surface 31 of the large-diameter end section 12 on the central side of the boot from the protruding section 28. FIG. 10 is a sectional view illustrating a state in which the large-diameter end section 12 illustrated in FIG. 9 is installed on the opening end section 18 of the outer race 2 illustrated in FIG. 8.

Next, the installation portions of the small-diameter end section 13 of the boot 11 and the shaft 9 are described with reference to FIGS. 11 to 13.

Figure 11:
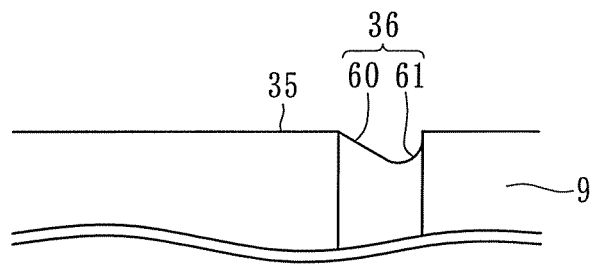
FIG. 11 A front view illustrating a shaft according to the second embodiment of the present invention.

FIG. 11 is a front view illustrating the shaft 9. A fitting groove 36 is formed on the outer peripheral surface 35 of the shaft 9. This fitting groove 36 has a shape in which a tapered section 60 formed such that its diameter is reduced toward the central side of the shaft (right side in the figure) and a curved surface section 61 formed such that its diameter is increased toward the central side of the shaft are arranged continuously in this order toward the central side of the shaft.

Figure 12:
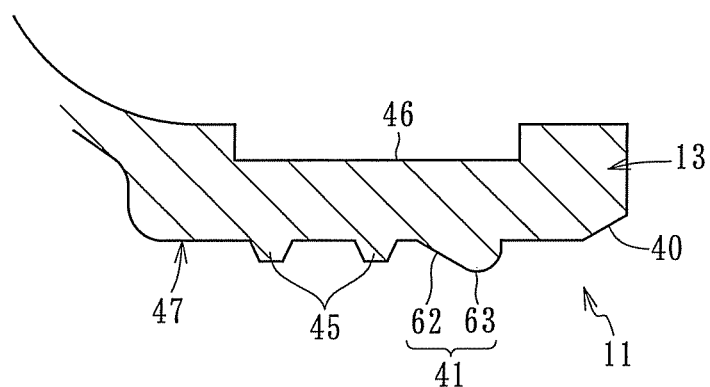
FIG. 12 A sectional view illustrating the small-diameter end section of the boot according to the second embodiment of the present invention.
Figure 13:
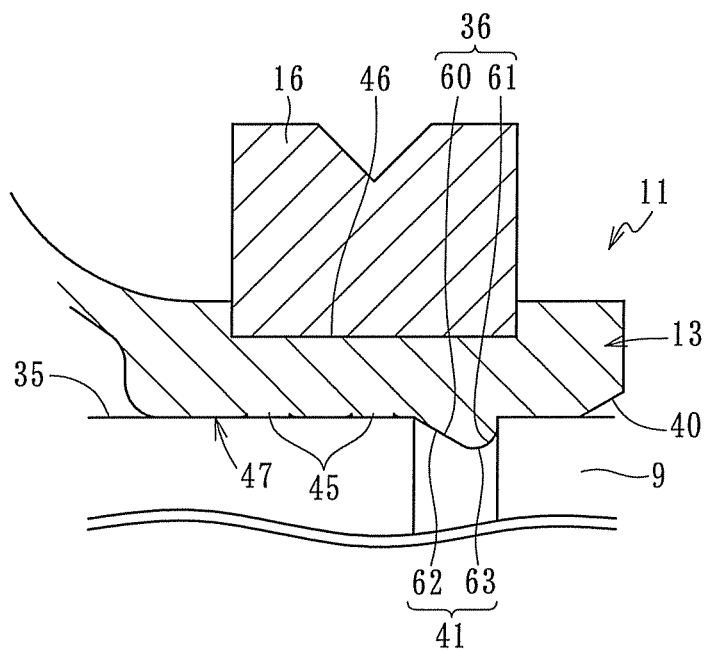
FIG. 13 A sectional view illustrating a state in which the small-diameter end section of the boot illustrated in FIG. 12 is installed on the shaft illustrated in FIG. 11.

FIG. 12 illustrates the small-diameter end section 13 of the boot 11. A protruding section 41 is provided on the inner peripheral surface 47 of the small-diameter end section 13, this protruding section 41 has a cross-sectional shape in which a tapered section 62 formed such that its diameter is reduced toward the opposite central side of the boot and a curved surface section 63 formed such that its diameter is increased toward the opposite central side of the boot are arranged continuously in this order from the central side of the boot (left side in the figure). Further, two sealing sections 45 having an inverted trapezoidal shape in cross section are provided on the inner peripheral surface 47 of the small-diameter end section 13 on the central side of the boot from the protruding section 41. FIG. 13 is a sectional view illustrating a state in which the small-diameter end section illustrated in FIG. 12 is installed on the shaft 9 illustrated in FIG. 11.

In this embodiment, the shape of the protruding section 28 provided on the large-diameter end section 12 of the boot 11 is conformed to the shape of the fitting groove 21 formed on the outer peripheral surface 20 of the opening end section of the outer race 2, and the shape of the protruding section 41 provided on the small-diameter end section 13 is conformed to the shape of the fitting groove 36 formed on the outer peripheral surface 35 of the shaft 9. Herein, "the shape is made to coincide with" means that when the protruding sections (28, 41) are fitted into the fitting grooves (21, 36), no clearance is generated between the protruding sections and the fitting grooves (21, 36), in other words, the sizes and outer shapes of the protruding sections are the same as those of the fitting grooves (21, 36). In this case, the protruding sections (28, 41) can be fitted into the fitting grooves (21, 36) easily, and when the end sections (large-diameter end section 12 and small-diameter end section 13) of the boot 11 are installed on the opening end section 18 of the outer race or the shaft 9, the positioning in the axial direction is facilitated. In addition, as illustrated in FIGS. 10 and 13, since the protruding sections (28, 41) are fitted into the fitting grooves (21, 36) with no clearance, the sealability of the end sections (large-diameter end section 12 and small-diameter end section 13) of the boot can also be improved.

The details other than the above-mentioned point of the shapes of the fitting grooves (21, 36) formed on the outer peripheral surface 20 of the opening end section 18 of the outer race 2 or on the outer peripheral surface 35 of the shaft 9, the shapes of the protruding sections (28, 41) and the sealing sections (30, 45) provided on the inner peripheral surface 31 of the large-diameter end section 12 of the boot 11 or the inner peripheral surface 47 of the small-diameter end section 13, and the details of the operations and effects of those have already been described in the first embodiment illustrated in FIGS. 1A to 7. Therefore, their descriptions are omitted.

Figure 14:
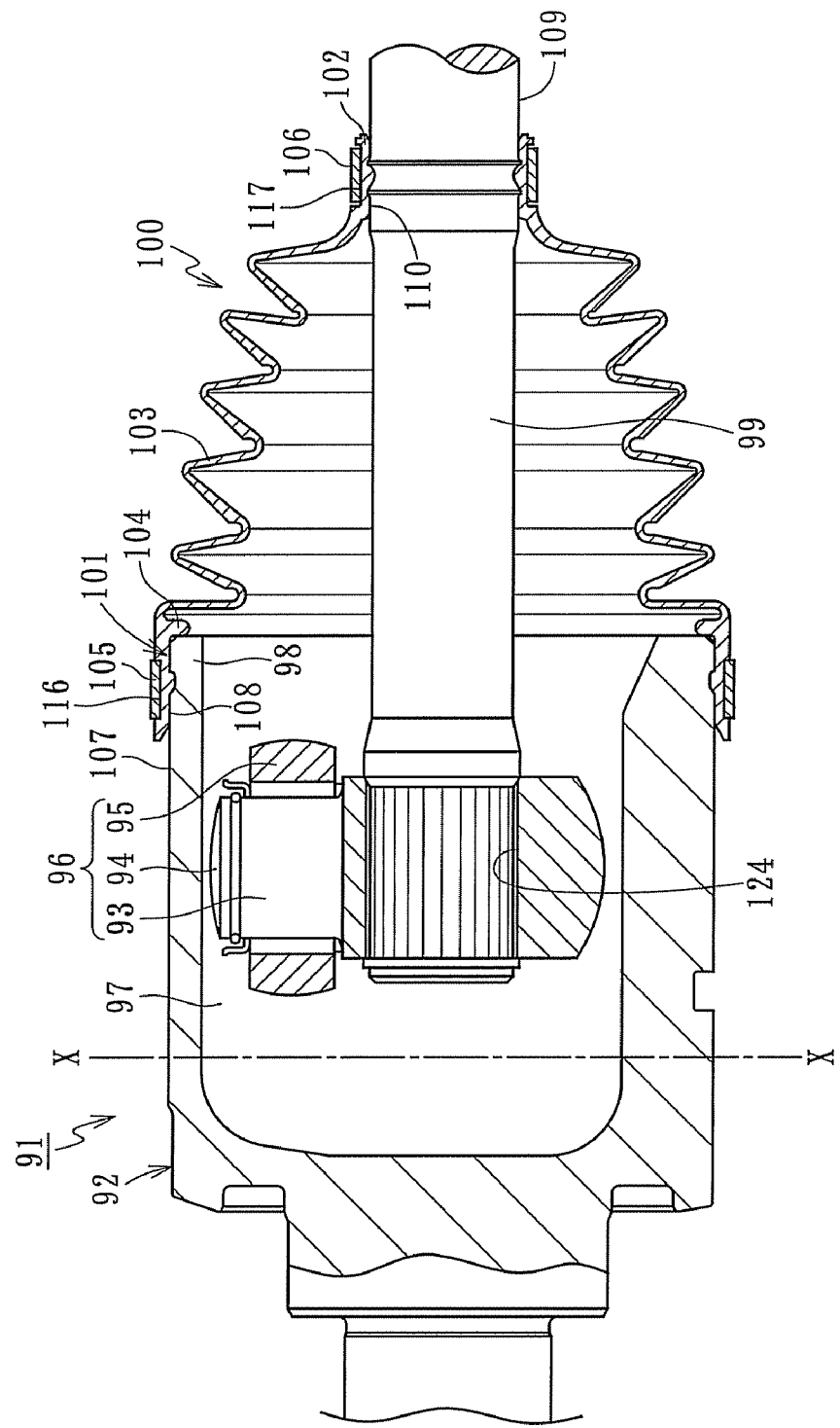
FIG. 14 A sectional view illustrating a constant velocity universal joint according to a third embodiment of the present invention.

FIG. 14 illustrates, as a third embodiment according to the present invention, an embodiment obtained by applying the present invention to a tripod type constant velocity universal joint serving as a slide-type constant velocity universal joint.

This constant velocity universal joint 91 has main components including an outer race 92 serving as an outer joint member, a tripod member 93 serving as an inner joint member, and rollers 95. Three straight track grooves 97 extending in the axial direction are formed on the inner peripheral surface of the outer race 92. The tripod member 93 has three journals 94 protruding in the radial direction. The roller 95 is rotatably supported on this journal 94, and the roller 95 is rollably inserted into the track groove 97 of the outer race 92 and guided along the track groove 97. The tripod member 93 having the above-mentioned three journals 94 and the rollers 95 constitute an internal component set 96 that is accommodated inside the outer race 92. A shaft 99 serving as a shaft member is spline-fitted in the center hole 124 of the tripod member 93, and a bellows-like boot 100 made of thermoplastic polyester elastomer is installed in the range from the shaft 99 to the opening end of the outer race 92. This boot 100 includes a large-diameter end section 101, a small-diameter end section 102, and a bellows-like intermediate section 103 connecting the large-diameter end section 101 and the small-diameter end section 102. The large-diameter end section 101 is installed on the outer peripheral surface 107 of the opening end section 98 of the outer race 92, the small-diameter end section 102 is installed on the outer peripheral surface 109 of the shaft 99, and the respective installation portions are tightened and fixed by fitting boot bands (105, 106) serving as fixing components in a band fitting groove 116 formed on the outer peripheral surface of the large-diameter end section 101 and a band fitting groove 117 formed on the outer peripheral surface of the small-diameter end section 102, respectively. The above-mentioned respective installation portions are described below.

Figure 15A:
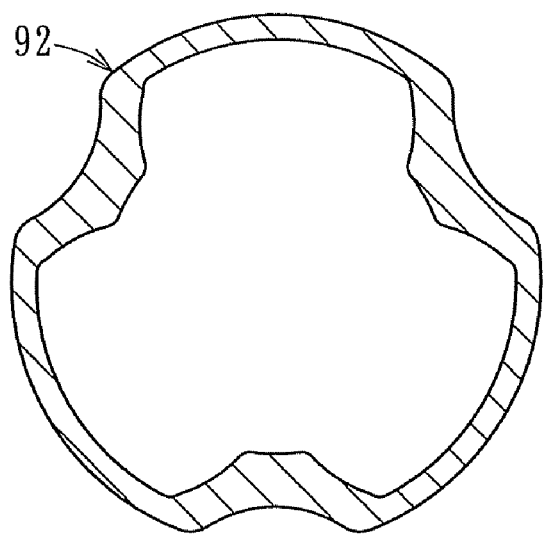
FIG. 15A A sectional view of the outer race taken along the line X-X of FIG. 14.
Figure 15B:
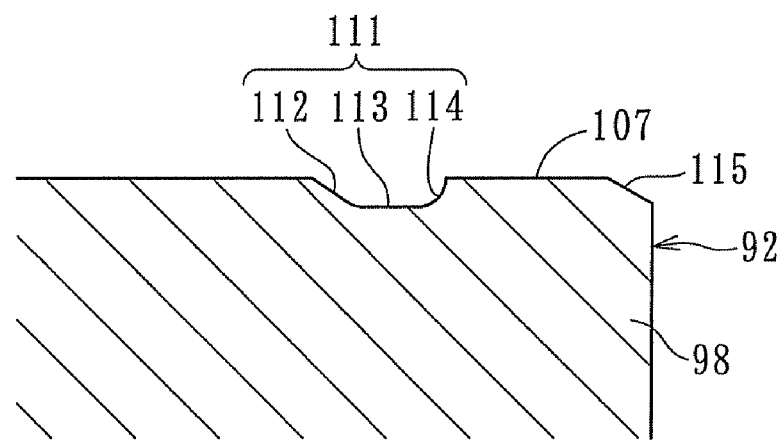
FIG. 15B An enlarged view illustrating the opening end section of the outer race illustrated in FIG. 14.

FIGS. 15A and 15B are sectional views illustrating the outer race 92 illustrated in FIG. 14. FIG. 15A is a sectional view of the outer race 92 taken on the line X-X of FIG. 14; as illustrated in this figure, the outer race 92 is noncylindrical and has a shape in which a small outer diameter portion and a large outer diameter portion are alternately arranged continuously. FIG. 15B is a sectional view illustrating the large outer diameter portion of the opening end section 98 of the outer race 92.

As illustrated in FIG. 15B, a fitting groove 111 is formed on the outer peripheral surface 107 of the large outer diameter portion of the outer race 92. This fitting groove 111 has a cross-sectional shape in which a tapered section 112, a bottom section 113, and a curved surface section 114 are arranged continuously in this order from the opposite side of the opening section of the outer race. Since the details of the operation and effect of the fitting groove 111 having this shape have already been described with reference to FIG. 2 for illustrating the first embodiment, their descriptions are omitted.

Figure 16A:
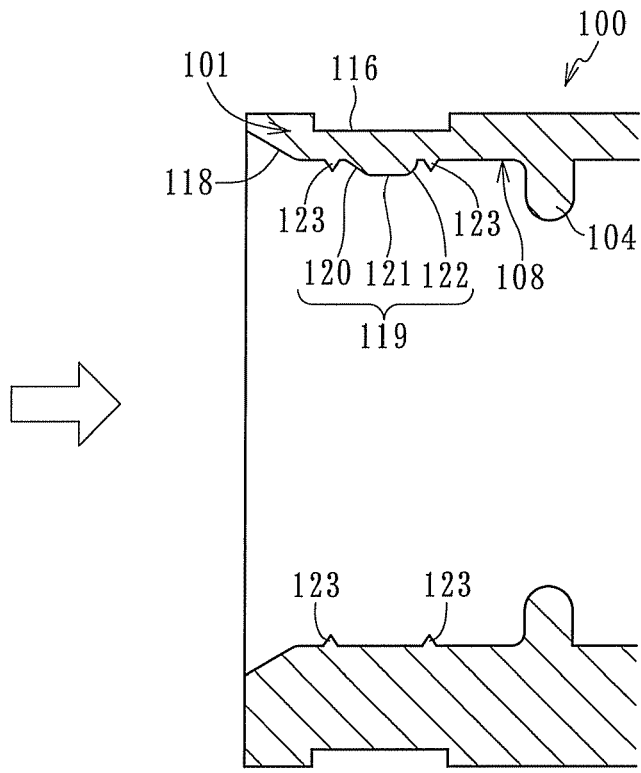
FIG. 16A An enlarged view illustrating the large-diameter end section of the boot illustrated in FIG. 14.
Figure 16B:
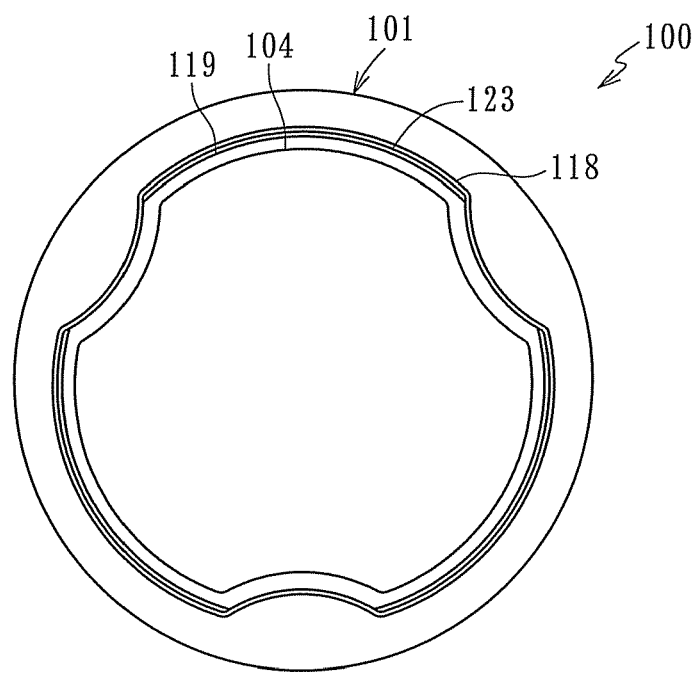
FIG. 16B A view on arrow taken in the direction of the hollow arrow illustrated in FIG. 16A.

FIGS. 16A and 16B illustrate the large-diameter end section 101 of the boot 100 illustrated in FIG. 14. As illustrated in FIG. 16A, on the inner peripheral surface 108 of the large-diameter end section 101 and at the tip end thereof, a tapered section 118 is formed such that its diameter is reduced toward the central side (the right side in the figure) of the boot, and two sealing sections 123, a protruding section 119 and a shoulder section 104 are provided on the central side of the boot from this tapered section 118.

The protruding section 119 has a cross-sectional shape in which a tapered section 120 formed such that its diameter is reduced toward the central side of the boot, a flat section 121 and a curved surface section 122 formed such that its diameter is increased toward the central side of the boot are formed continuously in this order toward the central side of the boot. The protruding section 119 is provided by being integrally molded with the large-diameter end section 101 and is fitted into the fitting groove 111 formed on the outer peripheral surface 107 of the opening end section 98 of the outer race 92 illustrated in FIG. 15B. As a result, the large-diameter end section 101 can be positioned in the axial direction at the opening end section 98 of the outer race 92, and sealability can be imparted to the large-diameter end section 101.

The two sealing sections 123 have a triangular shape in cross section with a pointed end and are respectively provided annularly at positions equally distant from the protruding section 119 in the axial direction by being integrally molded with the large-diameter end section 101.

The sealing sections 123 are brought into close contact with the portions excluding the fitting groove 111 on the outer peripheral surface 107 of the opening end section 98 of the outer race 92 illustrated in FIG. 15B, whereby the sealability of the large-diameter end section 101 of the boot 100 can be improved. This effect becomes significant in the case where a plurality of the sealing sections 123 are used and provided on both sides of the protruding section 119 as in the case of this embodiment. Since the reasons for this have already been described with reference to FIG. 3 for illustrating the first embodiment, their detailed descriptions are omitted. Further, in this embodiment, since tightening and fixing are carried out by fitting the boot band 105 serving as a fixing component into the band fitting groove 116 formed on the outer peripheral surface of the large-diameter end section 101, the large-diameter end section 101 can be fixed to the opening end section 98 of the outer race 92 rigidly and stably. Since the reasons for this have also already been described with reference to FIG. 3 for illustrating the first embodiment, their detailed descriptions are omitted.

Figure 19:
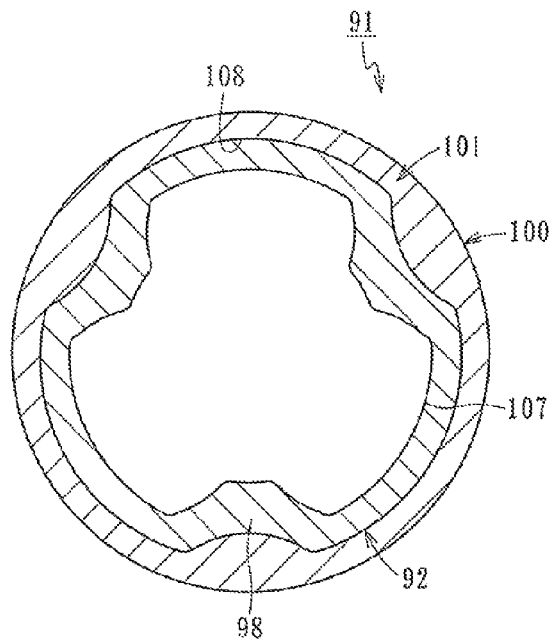
FIG. 19 A cross sectional view illustrating the installation portions of the opening end section of the outer race and the large-diameter end section of the boot illustrated in FIG. 14.
Figure 20:
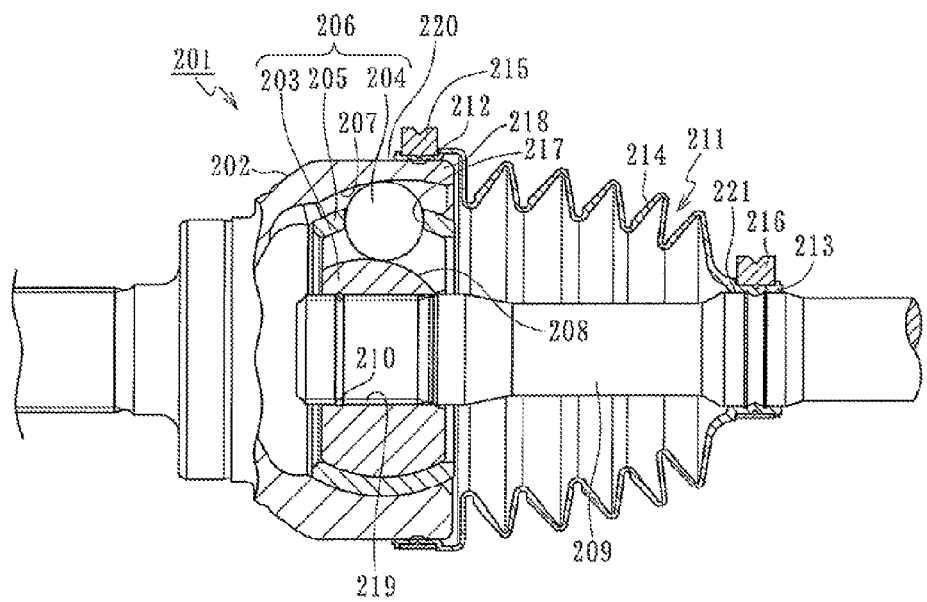
FIG. 20 A sectional view illustrating an example of a constant velocity universal joint.
Figure 21:
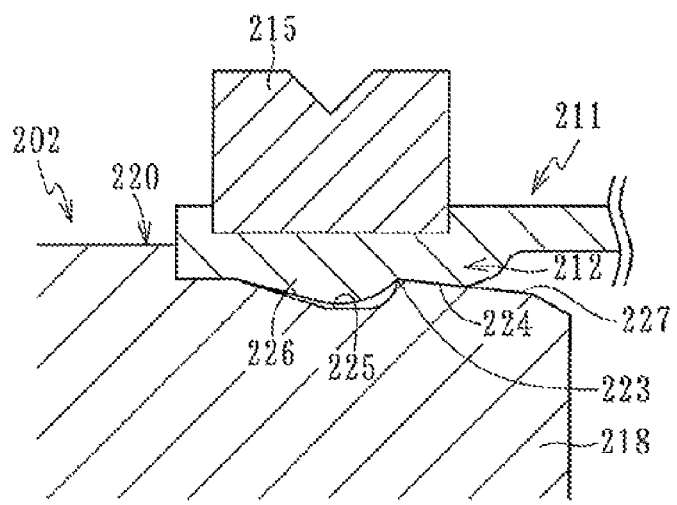
FIG. 21 A sectional view illustrating the installation portions of the opening end section of the outer race and the large-diameter end section of the boot according to the conventional example illustrated in FIG. 20.
Figure 22A:
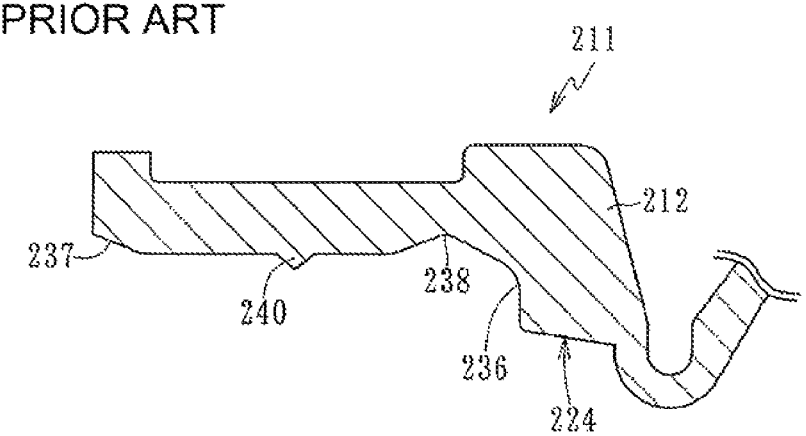
FIG. 22A A sectional view illustrating the large-diameter end section of the boot.
Figure 22B:
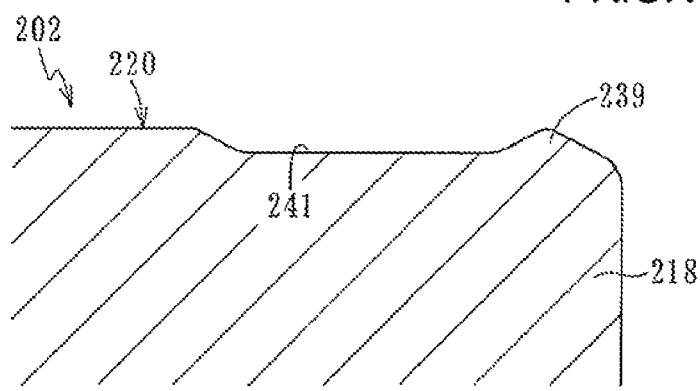
FIG. 22B A sectional view illustrating the opening end section of the outer race.
Figure 22C:
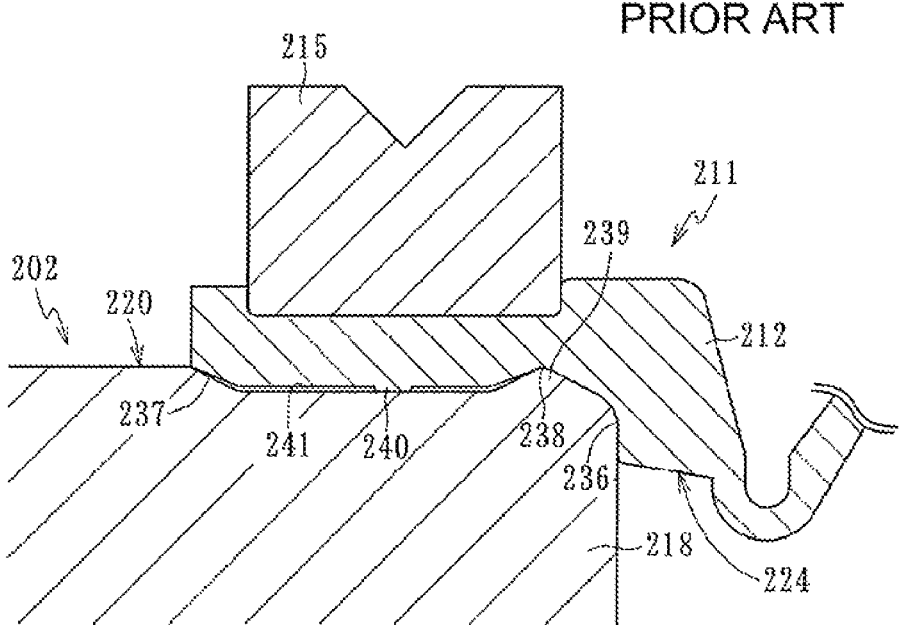
FIG. 22C A sectional view illustrating the installation portions of the opening end section of the outer race and the large-diameter end section of the boot according to a conventional example different from that illustrated in FIG. 21, and a sectional view illustrating a state in which the large-diameter end section of the boot illustrated in FIG. 22A is installed on the opening end section of the outer race illustrated in FIG. 22B.

In this embodiment, the large-diameter end section 101 has a shape in which a thick wall portion and a thin wall portion are formed alternately as illustrated in FIG. 16B which is an arrow view taken from the side of the hollow arrow illustrated in FIG. 16A so that the inner peripheral surface 108 of the large-diameter end section 101 is formed into the shape in conformity with the outer shape of the opening end section 98 of the outer race 92 illustrated in FIG. 15A. The protruding section 119, which is provided on the inner peripheral surface 108 of the large-diameter end section 101 and has already been described with reference to FIG. 16A, is fitted into the fitting groove 111 formed on the outer peripheral surface 107 of the opening end section 98 of the outer race 92 illustrated in FIG. 15B. As a result, the inner peripheral surface 108 of the large-diameter end section 101 is brought into close contact with the outer peripheral surface 107 of the opening end section 98 of the outer race 92 along the entire circumferential length as illustrated in FIG. 19, and sealability can be imparted to the large-diameter end section 101. Further, this effect becomes significant in the case where tightening and fixing are carried out by fitting the boot band 105 into the band fitting groove 116 on the outer peripheral surface of the large-diameter end section 101 as in the case of this embodiment (see FIG. 14). The reason for this is that since no clearance is generated between the large-diameter end section 101 and the opening end section 98 of the outer race 92 in the circumferential direction in the case of this embodiment, the inner peripheral surface 108 of the large-diameter end section 101 can be rigidly brought into close contact with the outer peripheral surface 107 of the opening end section 98 of the outer race 92 in the circumferential direction using the tightening force of the boot band 105.

Moreover, as illustrated in FIGS. 16A and 16B, with respect to the protruding section 119 and the sealing sections 123 provided on the inner peripheral surface 108 of the large-diameter end section 101 of the boot 100, the protruding section 119 is formed in the circumferential direction on the inner peripheral surface 108 only at the thin wall portions of the large-diameter end section 101, and the sealing sections 123 are formed around the entire circumference of the inner peripheral surface 108 of the large-diameter end section 101. The reason for this is that the protruding section 119 performs a positioning function when the large-diameter end section 101 is installed on the opening end section 98 of the outer race 92, that this function can be carried out even in the case where the protruding section 119 is not provided around the entire circumference of the inner peripheral surface 108 of the large-diameter end section 101, and that sufficient sealability cannot be imparted to the large-diameter end section 101 when the sealing sections 123 are not provided around the entire circumference of the inner peripheral surface 108 of the large-diameter end section 101.

A shoulder section 104 is provided on the central side of the boot from the sealing section 123 disposed on the central side of the boot among the two sealing sections 123 by being integrally molded with the large-diameter end section 101. The opening end section 98 of the outer race 92 is brought into contact with this shoulder section 104, whereby when the large-diameter end section 101 is installed on the opening end section 98 of the outer race 92, the positioning of the large-diameter end section 101 in the axial direction can be carried out more reliably. In addition, even after the large-diameter end section 101 has been installed on the opening end section of the outer race 92, the large-diameter end section 101 can be prevented from being displaced in the axial direction toward the opposite side of the opening section of the outer race.

Since the details of the shapes, operations and effects of the tapered section 118, the protruding section 119 and the sealing sections 123 illustrated in FIG. 16A have already been described with reference to FIGS. 1A and 2 for illustrating the first embodiment, their descriptions are not repeated and are omitted herein.

Next, the installation portions (see FIG. 14) of the shaft 99 and the small-diameter end section 102 of the boot 100 are described with reference to FIGS. 17 and 18.

Figure 17:
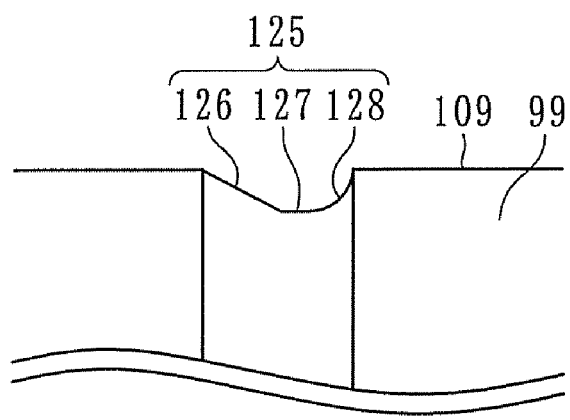
FIG. 17 A front view illustrating the shaft illustrated in FIG. 14.

FIG. 17 is a front view illustrating the shaft 99. A fitting groove 125 is formed on the outer peripheral surface 109 of the shaft 99. This fitting groove 125 has a shape in which a tapered section 126 formed such that its diameter is reduced toward the central side (the right side in the figure) of the shaft, a bottom section 127, and a curved surface section 128 formed such that its diameter is increased toward the central side of the shaft are arranged continuously in this order toward the central side of the shaft. Since the details of the operation and effect of the fitting groove 125 having this shape have already been described with reference to FIG. 2 for illustrating the first embodiment, their descriptions are omitted.

Figure 18:
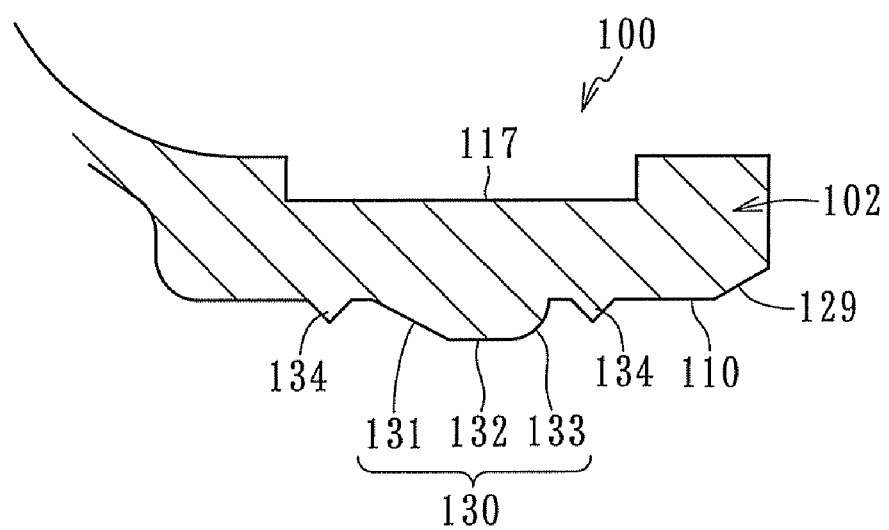
FIG. 18 An enlarged view illustrating the small-diameter end section of the boot illustrated in FIG. 14.

Further, as illustrated in FIG. 18, a tapered section 129 is formed annularly such that its diameter is reduced toward the central side (the left side in the figure) of the boot on the inner peripheral surface 110 of the small-diameter end section 102 of the boot 100 at the tip end section thereof, and two annular sealing sections 134 and an annular protruding section 130 are provided on the central side of the boot from this tapered section 129.

The protruding section 130 has a cross-sectional shape in which a tapered section 131 formed such that its diameter is increased toward the central side of the boot, a flat section 132, and a curved surface section 133 formed such that its diameter is reduced toward the central side of the boot are formed continuously in this order from the central side of the boot. The protruding section 130 is provided by being integrally molded with the small-diameter end section 102.

The two annular sealing sections 134 each have a triangular shape in cross section with a pointed end and are respectively provided at positions equally distant from the protruding section 130 in the axial direction by being integrally molded with the small-diameter end section 102. The operations and effects of the sealing sections 134 and the protruding section 130 become significant by fitting the boot band 106 serving as a fixing component into the band fitting groove 117 formed on the outer peripheral surface of the small-diameter end section 102 as in the case of this embodiment. Since this principle is the same as that in the case where the boot band 15 is fitted into the band fitting groove 33 of the large-diameter end section 12 as illustrated in FIG. 3 for illustrating the first embodiment and has already been described, the detailed descriptions thereof are omitted. Further, the shapes of the protruding section 130 and the sealing sections 134, the operations and effects thereof and the details of the tapered section 129 have already been described with reference to FIGS. 1A, 1B and 5 for illustrating the first embodiment, the detailed descriptions thereof are omitted.

Even in this embodiment, as in the case of the first and second embodiments illustrated in FIGS. 1A to 13, the protruding section 119 and the sealing sections 123 are provided in the range of the axial width of the boot band 105 serving as a fixing component on the inner peripheral surface 108 of the large-diameter end section 101 of the boot 100, and the protruding section 130 and the sealing sections 134 are provided in the range of the axial width of the boot band 106 on the inner peripheral surface 110 of the small-diameter end section 102 of the boot 100. The operations and effects in this case have already been described with reference to FIGS. 3 and 6 for illustrating the first embodiment, the detailed descriptions thereof are omitted.

In the embodiments described above, thermoplastic polyester elastomer is used as the material of the boot; however, without being limited to this, chloroprene rubber or vinyl methyl silicone rubber can also be used as the material.

In the case where chloroprene rubber is used as the material, a rubber material designated by Type A (JIS K6253) durometer hardness of 50 to 70 can be used. When the Type A durometer hardness is less than 50, the material is too soft and hence the rotational expansibility, flexibility, and strength of the boot are reduced. When the Type A durometer hardness is more than 70, the material is too hard, and the fatigability, etc. are reduced. Therefore, in both cases, the boot does not perform its function.

In the case where vinyl methyl silicone rubber is used as the material, a rubber material designated by Type A (JIS K6253) durometer hardness of 55 to 70 can be used. When the Type A durometer hardness is less than 55, the material is too soft and hence the rotational expansibility, flexibility, and strength of the boot are reduced. When the Type A durometer hardness is more than 70, the material is too hard, and hence the fatigability, etc. are reduced. In both cases, the boot does not perform its function.

Further, although the shoulder section provided on the inner peripheral surface of the large-diameter end section of the boot is provided annularly in the embodiments described above, even when the shoulder section is provided intermittently in the circumferential direction, the operation and effect of the shoulder section can be obtained.

The embodiments described herein are merely examples which can be modified as desired within the spirit and the scope of the claims.

The invention claimed is:

1. A constant velocity universal joint comprising:
an outer joint member having an opening end section;
an inner joint member accommodated inside the outer joint member and connected to the outer joint member so that torque can be transmitted therebetween; and
a boot having a first end section and a second end section, wherein
the first end section of the boot is installed on an outer peripheral surface of the opening end section of the outer joint member,
the second end section of the boot is installed on an outer peripheral surface of a shaft member extending from the inner joint member,
one of the first and second end sections of the boot has a protruding section formed on its inner peripheral surface that is fitted into a fitting groove formed on a respective one of an outer peripheral surface of the opening end section of the outer joint member and an outer peripheral surface of the shaft member,
the one of the first and second end sections of the boot also has sealing sections with a tapered shape provided annularly on portions of its inner peripheral surface excluding the protruding section,
the sealing sections are provided on the inner peripheral surface of the one of the first and second end sections at locations that are within an axial width of an area of an outer peripheral surface of the one of the first and second end sections of the boot where a fixing component is to be installed,
the sealing sections are in close contact with portions excluding the fitting groove on the one of the outer peripheral surface of the opening end section of the outer joint member and the outer peripheral surface of the shaft member, and
a portion of the respective one of the outer joint member and the shaft member formed at an intersection of a curved surface section of the fitting groove and the outer peripheral surface bites into the inner peripheral surface of the one of the first and second end sections of the boot due to the fixing component.

2. A constant velocity universal joint according to claim 1, wherein each of the sealing sections has a tip end formed into a tapered shape.

3. A constant velocity universal joint according to claim 2, wherein the sealing sections are provided at a plurality of places on the portions excluding the protruding section on the inner peripheral surface of the one of the first and second end sections of the boot.

4. A constant velocity universal joint according to claim 3, wherein the sealing sections are provided on both sides of the protruding section on the inner peripheral surface of the one of the first and second end sections of the boot in an axial direction of the boot.

5. A constant velocity universal joint according to claim 1, wherein the sealing sections are provided at a plurality of places on the portions excluding the protruding section on the inner peripheral surface of the one of the first and second end sections of the boot.

6. A constant velocity universal joint according to claim 5, wherein the sealing sections are provided on both sides of the protruding section on the inner peripheral surface of the one of the first and second end sections of the boot in an axial direction of the boot.

7. A constant velocity universal joint according to claim 1, wherein a radial length of the sealing sections is shorter than a radial length of the protruding section.

8. A constant velocity universal joint according to claim 1, wherein a radial length of the fitting groove is equal to or greater than a radial length of the protruding section.

9. A constant velocity universal joint according to claim 1, wherein a shape of the protruding section conforms to a shape of the fitting groove.

10. A constant velocity universal joint according to claim 1, wherein:
the opening end section of the outer joint member is non-cylindrical;
the inner peripheral surface of the first end section of the boot installed on the outer peripheral surface of the opening end section of the outer joint member has a shape in conformity with an outer shape of the opening end section of the outer joint member; and
the outer peripheral surface of the opening end section of the outer joint member and the inner peripheral surface of the first end section of the boot installed thereon are in close contact with each other with no clearance therebetween.

11. A constant velocity universal joint according to claim 1, wherein the protruding section and the sealing sections are integrally molded with the one of the first and second end sections of the boot.

12. A constant velocity universal joint according to claim 1, wherein the protruding section and the sealing sections are separate from the one of the first and second end sections of the boot.

13. A constant velocity universal joint according to claim 1, wherein:
the first end section is the one of the first and second end sections;
the first end section of the boot installed on the outer joint member has a shoulder section protruding in an inner diametrical direction on the portions excluding the protruding section on the inner peripheral surface thereof, and the opening end section of the outer joint member is brought into contact with the shoulder section.

14. A constant velocity universal joint according to claim 13, wherein the shoulder section is integrally molded with the first end section of the boot.

15. A constant velocity universal joint according to claim 13, wherein the shoulder section is separate from the first end section of the boot.

* * * * *